(12) United States Patent
Schroeder et al.

(10) Patent No.: US 10,035,645 B2
(45) Date of Patent: Jul. 31, 2018

(54) SAFETY AND CLEANING DEVICE FOR SINGLE CUP COFFEE MAKER

(71) Applicants: Otto Schroeder, Mineola, NY (US); Annette Gucciardo, Mineola, NY (US)

(72) Inventors: Otto Schroeder, Mineola, NY (US); Annette Gucciardo, Mineola, NY (US)

( * ) Notice: Subject to any disclaimer, the term of this patent is extended or adjusted under 35 U.S.C. 154(b) by 427 days.

(21) Appl. No.: 14/630,135

(22) Filed: Feb. 24, 2015

(65) Prior Publication Data

US 2015/0239655 A1 Aug. 27, 2015

Related U.S. Application Data

(60) Provisional application No. 62/037,884, filed on Aug. 15, 2014, provisional application No. 61/975,058, (Continued)

(51) Int. Cl.
*A47J 31/40* (2006.01)
*B65D 85/804* (2006.01)
(Continued)

(52) U.S. Cl.
CPC ....... *B65D 85/8043* (2013.01); *A47J 31/3623* (2013.01); *A47J 31/3628* (2013.01); (Continued)

(58) Field of Classification Search
CPC ............... A47J 31/3623; A47J 31/3628; A47J 31/3695; A47J 31/42; A47J 31/44; (Continued)

(56) References Cited

U.S. PATENT DOCUMENTS 2,776,787 A * 1/1957 Nicol .................. B65D 17/502
206/813
D642,454 S 8/2011 Santoiemmo
(Continued)

FOREIGN PATENT DOCUMENTS

EP 2604547 A1 6/2013
WO WO2012164521 * 12/2012 .......... B65D 65/466
(Continued)

OTHER PUBLICATIONS

Beth, Mary, Exploding K-Cups, K-Cup Barista Blog and comments, http://www.kcupbarista.com/2011/06/exploding-k-cups/, Printed Jul. 30, 2014, 19 pages.
(Continued)

*Primary Examiner* — J. Gregory Pickett
*Assistant Examiner* — Elizabeth Volz
(74) *Attorney, Agent, or Firm* — Brad M. Behar & Associates, PLLC

(57) ABSTRACT

The present invention is a product and method for conveniently cleaning a single cup brewing machine's pod/cup canister. The present invention is also an improved pod/cup that reduces the chance for over pressurization and unwanted explosions during the brewing process. The pod/cup according to the invention is designed in the same general shape and configuration as a pod/cup intended to be used in the machine with a plurality of apertures in the side of the pod. This invention also includes an improved machine canister with a plurality of piercing pins. Still further, the invention includes a new cup puncture device with puncture pins or blades that can be used on the pod prior to insertion into the canister.

18 Claims, 32 Drawing Sheets

Related U.S. Application Data filed on Apr. 4, 2014, provisional application No. 61/944,172, filed on Feb. 25, 2014.

(51) Int. Cl.
<table>
<tr><td>A47J 31/44</td><td>(2006.01)</td></tr>
<tr><td>A47J 31/42</td><td>(2006.01)</td></tr>
<tr><td>A47J 31/36</td><td>(2006.01)</td></tr>
<tr><td>A47J 31/60</td><td>(2006.01)</td></tr>
<tr><td>B65D 75/04</td><td>(2006.01)</td></tr>
</table>

(52) U.S. Cl.
CPC .......... *A47J 31/3695* (2013.01); *A47J 31/42* (2013.01); *A47J 31/44* (2013.01); *A47J 31/60* (2013.01); *B65D 75/04* (2013.01); *B65D 85/8046* (2013.01)

(58) Field of Classification Search
CPC . A47J 31/60; B65D 85/8046; B65D 85/8043; B65D 75/04
USPC ............ 99/295, 323; 220/676; 426/115, 77, 426/433; 134/22.1; 206/497
See application file for complete search history.

(56) References Cited

U.S. PATENT DOCUMENTS

| | | |
|---|---|---|
| D652,266 S | 1/2012 | Smyers |
| D675,089 S | 1/2013 | Cook et al. |
| D684,048 S | 6/2013 | Hodge et al. |
| D684,856 S | 6/2013 | Hodge et al. |
| D686,916 S | 7/2013 | O'Brien |
| D695,110 S | 12/2013 | Houlton et al. |
| D695,111 S | 12/2013 | Hansen et al. |
| 2003/0222089 A1* | 12/2003 | Hale .................. B65D 85/8043 220/574 |
| 2012/0121764 A1 | 5/2012 | Lai et al. |
| 2012/0121780 A1* | 5/2012 | Lai ...................... A47J 31/3623 426/433 |
| 2015/0150412 A1 | 6/2015 | Heitele |
| 2015/0157165 A1* | 6/2015 | Talon .................... A47J 31/407 206/0.5 |
| 2016/0058234 A1* | 3/2016 | Eppler ............... B65D 85/8043 99/289 R |

FOREIGN PATENT DOCUMENTS

| | | |
|---|---|---|
| WO | WO 2013/18826 A2 | 12/2013 |
| WO | WO 2013/182299 A1 | 12/2013 |
| WO | WO 2015/006367 A2 | 1/2015 |

OTHER PUBLICATIONS

Author Unknown, Energy Star Market & Industry Scoping Report Coffee Makers, Nov. 2011, 13 pages.

Author Unknown, FAQ from Ekobrew website, http://www.ekobrew.com/faq, Printed Jul. 28, 2014, 3 pages.

* cited by examiner

SAFETY AND CLEANING DEVICE FOR SINGLE CUP COFFEE MAKER

CROSS REFERENCE

This application claims the benefit of U.S. Provisional Application Ser. No. 61/944,172 filed on Feb. 25, 2014, U.S. Provisional Application Ser. No. 61/975,058 filed on Apr. 4, 2014, and U.S. Provisional Application Ser. No. 62/037,884 filed on Aug. 15, 2014, each which is expressly incorporated herein in its entirety by reference thereto.

FIELD OF THE INVENTION

The present invention relates to single serve brewing machines. More specifically, the present invention relates to convenient devices used to clean single serve brewing machines. The present invention also includes devices to help eliminate the explosion of pods in brewing machines when brewing single serve beverages.

BACKGROUND

The single cup coffee brewer machine (also called single-serve coffee makers) where individual pods/cups of coffee, tea, hot chocolate or the like, are inserted into the machine and mixed with hot water to create a single cup of beverage are ubiquitous. The convenience and ease of these machines to make individual cups of coffee instantaneously makes them highly desirable. Another advantage to these machines is the minimal amount of clean up required after the beverage is made. Normal use simply requires removal and disposal of the used pod/cup from the machine. If another cup of coffee, tea, hot chocolate, hot water, etc. is desired, a new pod/cup is inserted into the machine and the brewing button is activated. Common manufacturers of these singe cup brewing machines include Keurig, Bunn, Starbucks. The single cup coffee brewer machine offers a simple, quick, easy to use way to make a quick cup of coffee/tea/hot chocolate/etc. with minimal, if any, clean up required.

Many well known brands now distribute pods of hot chocolate, iced tea, fruit drinks, and other beverages, in addition to coffee of different strengths and flavors, for these machines. It is very common that a subsequent user of the machine will use a pod/cup from a different manufacturer or for a different flavored beverage. Oftentimes, the flavor/taste of the later made beverage may be compromised from small amounts/traces of residue left in the unit from the previously used pod/cup. The residue results from how the machine works—a sealed plastic pod/cup with a heat-sealed or glued on foil lid that contains ground coffee beans and a filter beneath the coffee is placed in a canister (pod or cup holder) in the machine. The plastic pod/cup is manufactured such that each pod/cup is sealed to preserve the contents during storage and for a better tasting (fresher tasting) beverage. The plastic pod/cup is placed into a compartment in the machine which is closed by the user. When closing, the pod/cup is pierced through the bottom of the plastic and through the top foil with needles in the machine breaking the airtight seal. The needles that pierce the pod/cup are cannulated with a channel through the length. With the needles inside the pod/cup, the holes through the needles create a path for hot water to flow through the pod, that is through the top needle, through the ground coffee (or other beverage making substance such as, e.g., hot chocolate powder), through the filter (used to keep grinds and other flavoring substances/solids in the pod from exiting the pod and going into the cup of beverage) and out of the pod, through the bottom needle into the surrounding canister (also called portion pack or cup holder), through an opening in the surrounding canister, and into a cup beneath the canister. It is very common for the inside of the canister to accumulate a solid and/or liquid residue of the beverage that was prepared, especially on the sides of the canister and inside the canister near its bottom. This residue is left behind inside the canister and along the surfaces of the openings in the canister, including the piercing needles/pins. The residue may cause a color or taste variation in the next beverage prepared in the machine which could negatively impact the beverage. Consumers may mistakenly believe the machine does not make good tasting beverages and/or that the beverage in the pod is not good and/or not fresh.

The manufacturers of these machines recognize there is a need to clean the machine but also recognize the inconvenience associated with the current method of cleaning. Manufacturers do suggest occasional cleaning of the canister and the machine (e.g., every 6 months) using descaling solutions. In reality, however, very few people follow these cleaning instructions and fail to clean the internal components resulting in significant residue accumulation in the machines. Particularly in communal settings such as a workplace or professional office, the convenience of the machine and the desire to minimize time spent at the beverage machine often causes neglect in its maintenance and cleaning and an absence of cleaning resources. Rare is the case that these machines are cleaned often, never mind daily or even more importantly after each use. In reality, the cleaning task requires effort and time detracting from the desirable convenience for using the machine.

With multiple users throughout the course of a single day, the flavor of the beverages can become compromised/impacted/altered. The integrity of the beverage product suffers and one of the main purposes of the single cup brewing machine, which is to allow users to enjoy a fresh, just-brewed beverage, fast and easily, is defeated. The resulting beverage winds up not having the fresh flavor that it was intended to have. Applicants have discovered a device and a method of cleaning the single cup brewing machine to address this problem.

Another significant issue with use of these machines is the risk for malfunction—the explosion of the beverage pod during the brewing process causing hot beverage to spill out of, sometimes spray out of, the top of the canister. There are known instances of beverage pod explosions near the end of the brewing cycle, after the water has filled the pod and a final blast of air is applied through the pod. There have been recalls of certain single cup brewing machines in the past few years due to the risk of burns (sometimes second and third degree burns) from the misdirected hot water or steam. Some single cup brewing machines have been recalled due to a problem with a faulty water reservoir causing steam to build up and thus forcing the canister open, causing an explosion of hot water, steam, and coffee grounds. There are also times where an explosion occurred in the beverage pod.

Applicants have discovered a way to improve the reliability of these machines and to reduce the number of accidents and injuries caused by spraying beverage and/or exploding cups. Applicants have discovered that in many instances, the spillage resulting from the explosion of the cup is due to a failure (breakage) of the foil on the tops of the cup. The foil and/or the seal between the plastic and the foil fails for one or more of the following reasons: 1) there is an opening or weakening in the top of the foil that the user does not see when inserting the cup into the canister which allows fluid to escape under pressure out of the top of the cup, and 2) the heat seal between the foil and the plastic cup is faulty or breaks under the pressure applied during the brewing cycle of the machine. Irrespective of the reason for the failure, Applicants have discovered that the danger and mess from a "blow out" in the brewing machine can, for the most part, be avoided, certainly minimized, by modifying the machine and/or the cup according to the invention.

There is a need for a convenient, easy, and fast way to clean the inside of the canister in a single serve brewing machine. There is a need for a cleaning device that can be easily used between brews. There is a need for a cleaning device that does not require dismantling of the brewing machine. There is a need for a safer pod/cup design that helps eliminate over-pressurization and explosions. There is a need for a safer way to make single serve beverages.

SUMMARY OF THE INVENTION

Applicants have invented devices that overcome these and other shortcomings. While the invention will be described in connection with certain embodiments, it will be understood that the invention is not limited to those embodiments. To the contrary, the invention includes all alternatives, modifications and equivalents as may be included within the spirit and scope of the present invention.

The current invention seeks to solve the aforementioned problems. The current invention is a product and method for cleaning the single cup brewing machine's pod/cup canister fast and easily so that the user can obtain a "cleaner" cup of beverage as intended by the machine manufacturer and product suppliers and as expected by the user. The current invention is fast and easy to use so as to not detract from the convenience of the machine. The minimal time it takes to use the device of the present invention is well worth the improved quality of the beverage resulting from the machine after its use. The present invention is also a much faster method and process to clean the primary mixing component in the machine (the canister) than the processes suggested by the manufacturer(s). The current invention is also a product and method for reducing the risk of an exploding pod/cup during the brewing and/or cleaning process. The current invention maintains the convenience of use of single cup brewing machines while also adding the benefit of improved safety.

The present invention includes an improved pod/cup used for cleaning the machine. The invention also includes an improved pod/cup that that may also be used for cleaning which also functions to prevent unwanted explosions. The invention furthermore includes an improved beverage pod/cup that reduces the chance for unwanted explosions. This invention also includes an improved machine canister that reduces the chance for unwanted explosions. Still further, the invention includes a new cup puncture device that can be used prior to insertion of the beverage cup into the canister that reduces the chance for unwanted explosions.

The cleaning pod/cup according to the invention is designed in the same general shape and configuration as a pod/cup intended to be used in the machine as shown in the accompanying Figures. The cleaning pod/cup according to the invention may be the same size as a pod/cup used to make beverages or it may be configured slightly smaller in size (e.g., circumference). The smaller sized cleaning pod/cup according to the invention increases distance between the exterior wall of the cleaning pod and the interior wall of the canister into which it is placed which, for some machines, creates a flow path for the cleaning solution inside the canister around its side wall. The gap/space between the exterior side wall of the invention's pod/cup and the canister wall allows the sides of the canister to be soaked/sprayed with a cleansing solution coming out of the cleaning pod/cup when used. Some machines, such as the Keurig, have "ridges" or "splines" inside the canister that create a spacing between the exterior side wall of the inserted pods/cup and the inside surfaces of the canister between "ridges/splines" for a flow path without the need for a smaller cleaning pod/cup.

The cleaning pod/cup according to the invention also differs, in part, from existing beverage pods/cups, because it contains apertures (covered with removable tape or wrapping in the preferred embodiment) around the cleaning pod/cup located on the upper half of the side wall along with a cleaning solution/tablet/gel/powder. Another difference for some embodiments of the invention is that it contains a flow diverter/director inside. In yet other embodiments of the invention, the foil top is replaced with a removable and replaceable lid creating a reusable/refillable device. The reusable/refillable pod/cup according to the invention may contain an attached flip-top cover or may include a separable top/cover (e.g, screwed fitting or snap on) that can be placed back on the pod after it has been refilled with the cleaning solution/tablet/gel/powder. Thus the top/cover may be made out of a thin foil material that can be easily pierced with the upper puncture needle in the machine, or it may be made out of a more durable material (e.g., hard plastic) that already includes a perforation/aperture so that the top does not need to be pierced by the upper puncture needle but instead allows the needle to pass through the top/cover or into a recess in the top/cover.

The apertures on the side of the cleaning pod/cup can be covered with an adhesive strip to prevent the cleaning solution/tablet/gel/powder from leaking out when stored/ prior to use. The adhesive strip, if used, is removed when the pod is ready for use—prior to installation in the canister. The apertures can be a variety of sizes or shapes and in a range of patterns to optimize spray or flow to the inside wall of the canister.

Inside the cleaning pod/cup, there may be a sponge or other porous material placed in the bottom to act as a flow restrictor/diverter. The flow restrictor/diverter prevents all of the cleansing fluid (inside the cleaning pod/cup from the start or created when the machine is activated and the hot water contacts the cleaning gel, tablet, and/or powder) from rushing completely out of the punctured bottom (and not the sides or top) of the cleaning pod/cup. If the pod contains a non-liquid type cleaning substance, such as, for example, a gel, tablet, or powder, this flow restrictor may not be necessary although it may still be advantageous to help direct flow of the cleaning solution out the side of the cleaning pod/cup to the sides of the canister and on the upper puncture needle.

The cleaning pod/cup is preferably made out of a thin plastic material with a top foil that can be pierced with the needles in the machine similar to the materials of construction for existing beverage pods/cups. To use the device of the invention, the removable foil/tape or wrapping is removed from the cleaning pod/cup and it is placed into the canister in the machine in the same manner as a beverage pod. The machine is closed causing the needles in the machine to pierce a hole in the top and the bottom of the cleaning pod/cup. It is preferred that the cleaning pod/cup according to the invention is about the same height as the existing beverage pods so that the resulting cleaning solution can contact and clean the piercing needles inside the machine.

When the machine is closed and turned on with the cleaning pod/cup inside, the hot water mixes with the cleaning substance and causes a cleaning liquid to flow out the apertures in the side of the cleaning pod/cup, out the bottom of the cleaning pod/cup through the bottom needle along the bottom of the canister, and around the piercing pins at the top and bottom of the canister. The opening/hole created in the bottom of the cleaning pod/cup also helps release/remove all of the fluid contents of the cleaning pod/cup during the cleaning step. This bottom opening/hole will help prevent a user from spilling any leftover hot liquid from the cleaning pod/cup during removal of the cleaning pod/cup. As done with existing beverage pods after use, the cleaning pod/cup is simply discarded after use. It may be preferred, although not necessary, to process water through the machine with no pod in place to flush out any remaining cleaning residue from the machine before making a beverage.

An alternate embodiment of the invention includes a cleaning pod/cup without any pre-existing apertures in the side of the device which are exposed by removing a removable tape/wrapping/or the like. The cleaning substance (fluid/gel/powder/tablet) and a flow restrictor/diverter are contained in the cleaning pod/cup. For such an embodiment, the invention further includes a separate handheld puncturing/perforating device that the cleaning pod/cup is placed into prior to use to create apertures in the side of the cleaning pod/cup. The handheld perforating device includes needles, pins, and/or protrusions, to pierce the side of the cleaning pod/cup when inserted into the handheld perforating device. After the cleaning pod/cup is perforated, the cleaning pod/cup pod is then placed into the machine as before and the machine is turned on.

In yet another embodiment of the invention, the cleaning pod/cup is made in a manner that it is refillable and reusable. In such an embodiment, the cleaning pod/cup is preferably made out of a harder and more durable material capable of handling repeated use, e.g., a hard plastic material. For such an embodiment of the invention, the device contains an opening/aperture in the bottom so that the bottom puncture needle in the machine can pass through the bottom of the cleaning pod/cup when the device is placed inside the canister in the machine. This assures that the puncturing needle will be cleaned. An alignment arrow or other positioning demarcation on the top of the cleaning pod/cup can be used to help align the cleaning pod/cup in the canister with the piercing pin at the bottom of the canister aligned with the opening/aperture in the bottom of the cleaning pod/cup. Alternative alignment devices and methods are also possible including ridges or tabs that fit in recesses in the canister. The embodiment of the invention that is refillable and reusable preferably includes a liftable and/or removable and replaceable top containing an opening/aperture through which the top piercing needle in the machine can pass. The top may be hinged and liftable or the top may be completely removable, such as, for example, a screw-top. For subsequent uses, the pod/cup may be refilled with the cleaning solution/tablet/gel/powder and then placed back into the machine as before.

The present invention not only offers a convenient way to clean a commonly used household and office single serve "coffee" machine, but it also improves the quality and flavor of the beverages made using the machine.

Another advantage to the cup according to the present invention as described above is the added openings/apertures in the cup prevent over pressurization of the cup. Having the apertures in the side allows for easier drainage of the liquid over only one exit out of the bottom needle. Accordingly, even if the bottom needle becomes clogged (one possible cause for excessive pressure and busting) the liquid will still drain out of the cup and into the canister out its bottom. The side apertures may be located near the top of the cup as for the cleaning cup described above, or, for a beverage cup containing a filter (e.g., coffee), the apertures may be located closer to the bottom of the pod/cup. For the invention for beverages, the apertures on the side of the cup can be located anywhere beneath the connection between the filter and the cup so that the apertures do not allow grinds to exit the cup. With additional exit paths for fluid, besides the one bottom needle, the risk of the pod/cup exploding is minimized due to the ability to avoid excessive pressure.

As for a cleaning cup according to the invention, the apertures for a beverage cup can be a variety of sizes or shapes and in a range of patterns. An adhesive strip, if used, is removed when the pod is ready for use—prior to installation in the canister.

Another embodiment of the invention includes a modified canister, portion pack, or cup holder containing more than one puncture needle at the bottom of the canister. When the pod/cup is inserted into the canister and the machine is closed, the bottom of the pod/cup is punctured by each of the needles in the bottom of the canister creating greater fluid exit area for the fluid as compared to just one needle as in existing machines. The bottom needles may all be the same height inside the canister or, more preferably, the needle heights may differ to make the puncturing process easier (require less force than if all were the same height and/or puncturing at the same time).

As for the cleaning cup, the separate handheld puncturing/perforating device can be used for a beverage cup. The pod/cup is placed into handheld puncturing/perforating device prior to use in the machine to create the plurality of apertures in the bottom. The handheld perforating device includes needles, pins, and/or protrusions, to puncture the bottom and/or the side of the pod/cup when inserted into the handheld perforating device. After the pod/cup is perforated, the pod/cup pod is then placed into the machine as before and the machine is turned on.

Yet another embodiment of the invention is useful to avoid a bursting beverage cup. Such an embodiment includes one or more seals, sections and/or panels on the pod/cup that open(s) when the pod/cup is pressurized (e.g., during the brewing cycle). When the pod/cup is inserted into the brewing machine and pressure increases inside the cup due to added water, the pressure causes a break in perforations or thinned material on the pod/cup or tape over apertures which creates pathway(s) for the fluid to exit the pod/cup under the internal pod filter. Preferably, the pressure-sensitive seal(s) and/or section(s) of the pod/cup is/are designed to open at a minimum pressure, most preferably a pressure that occurs during a normal brewing cycle for the machine to ensure that elevated pressures, and busting, do not occur. For example, the pressure-sensitive seal(s) and/or section(s) of the pod/cup could be designed to open at the upper range of the normal pressure of the brewing cycle which is typically in the range of 1 to 3 bars according to most single cup brewing machines.

These embodiments of the invention include the pod/cup configurations with apertures around the side of the pod/cup and a seal tape around the side over the apertures. The seal tape could be removable and/or could be designed to stay on the cup during brewing but made to break at the location(s) of the apertures in the pod/cup where the tape covers the apertures when the pressure exceeds a predetermined pressure, e.g., about 3 bars. Alternatively, the breakage pressure could be lower such that it occurs during the normal brewing cycle, such as, for example, at about 2 bars, and most preferably about 1 bar.

Most preferably for the beverage pod, the pressure-sensitive seal(s) and/or section(s) is/are located on the bottom of the pod/cup for a more preferred flow of fluid down and out of the canister. Accordingly, the pressure-sensitive seal(s) and/or section(s) may be a thinned line or lines of the plastic pod/cup created in the pod/cup during manufacture, using, for example, a press or stamp to perforate or weaken the bottom of the pod/cup in such a fashion that the pressure inside the pod/cup during the brewing cycle forces the pressure-sensitive seal(s) and/or section(s) area(s) to open. The pressure-sensitive seal(s) and/or section(s) of the cup may also be manufactured out of a thinner material than the rest of the pod/cup which may be accomplished by a modification of existing molds for the plastic pods/cups. The pressure-sensitive seal(s) and/or section(s) of the pod/cup may be any shape or configuration, such as, for example, a line or a plurality of lines, crossed lines, semi-circles and circles, star burst patterns, etc.

Most preferably, the pressure-sensitive seal(s) and/or section(s) of the pod/cup is/are perforated, stamped, or manufactured such that upon opening no plastic material breaks off of the pod/cup. No plastic should separate from the pod/cup and enter the beverage during brewing.

According to this embodiment of the invention, the resulting opening(s) in the pod/cup function as an exit pathway/openings/hole for the fluid to pass through. In some cases, e.g., a clogged exit pin, the pathway out the pressure-sensitive seal(s) and/or section(s) may be the sole exit pathway for fluid out of the pod/cup (depending on the machine and canister design).

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIGS. 1-7 show the pod in several views with a removable tape over a plurality of apertures in the side of the pod and FIGS. 8-14 show the same views without the removable tape. FIGS. 1 and 8 are front perspective views. FIGS. 2 and 9 are right side views. FIGS. 3 and 10 are left side views. FIGS. 4 and 11 are front views. FIGS. 5 and 12 are back views. FIGS. 6 and 13 are top views and FIGS. 7 and 14 are bottom views.

FIGS. 15-21 show the pod in several views with a removable tape over a plurality of apertures in the side of the pod and FIGS. 22-28 show the same views without the removable tape. FIGS. 15 and 22 are front perspective views. FIGS. 16 and 23 are right side views. FIGS. 17 and 24 are left side views. FIGS. 18 and 25 are front views. FIGS. 19 and 26 are back views. FIGS. 20 and 27 are top views and FIGS. 21 and 28 are bottom views.

FIGS. 29 and 30 show alternative embodiments for the pod with perforated bottoms.

FIGS. 36 and 37 also show a pod according to the invention shown above the puncturing/perforating device prior to insertion and positioned inside the puncturing/perforating device.

DETAILED DESCRIPTION OF THE INVENTION

Figure 1:
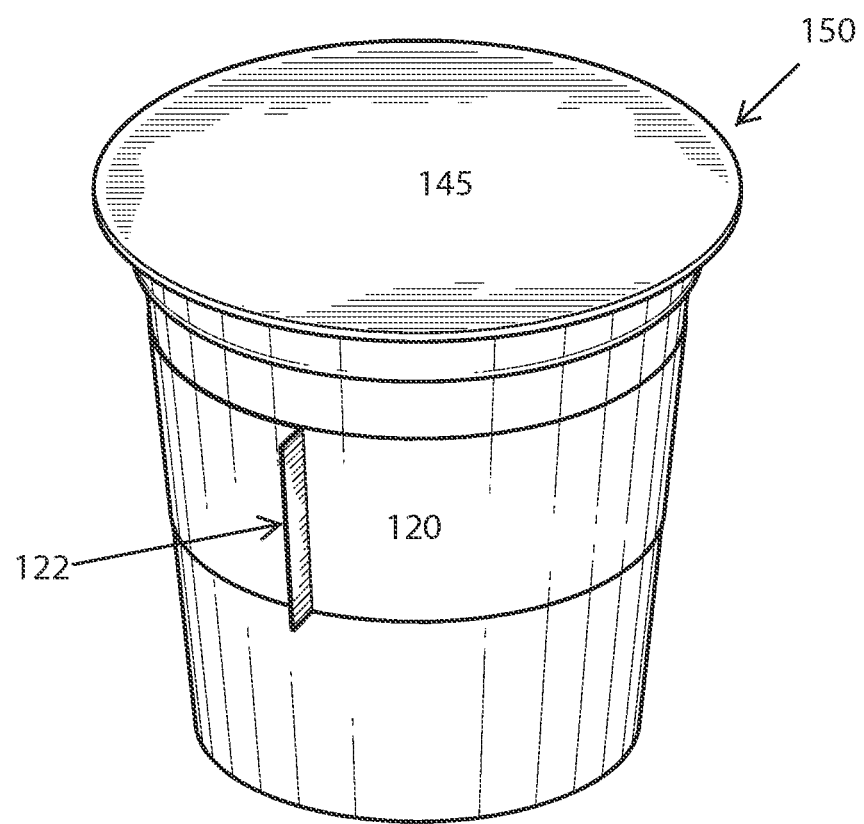
FIGS. 1-14 show one embodiment of a pod according to the invention.
Figure 2:
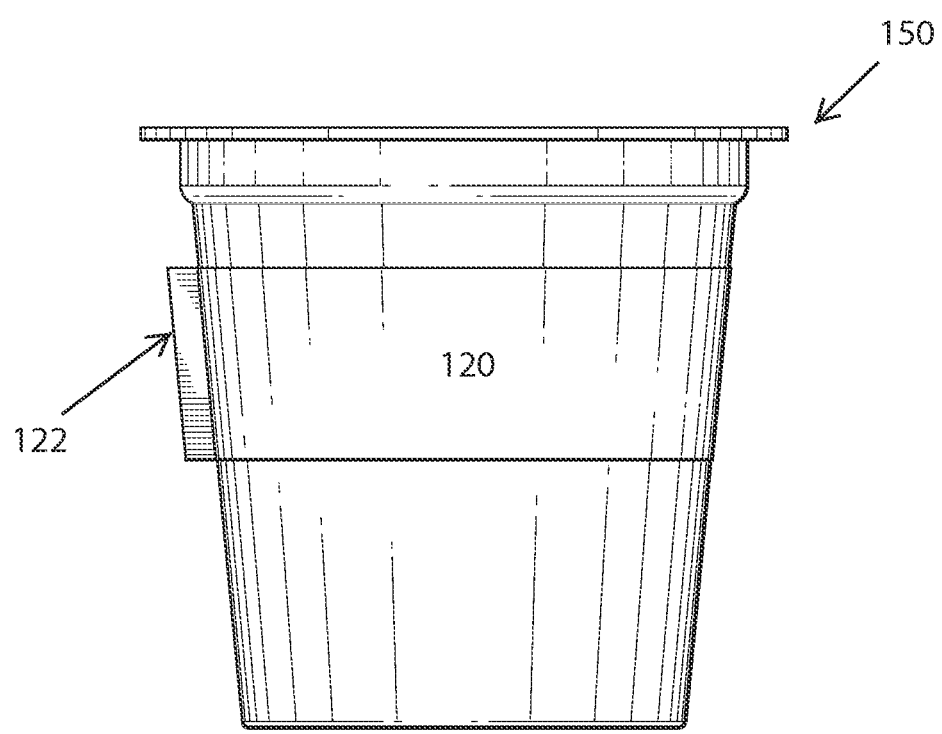
Figure 3:
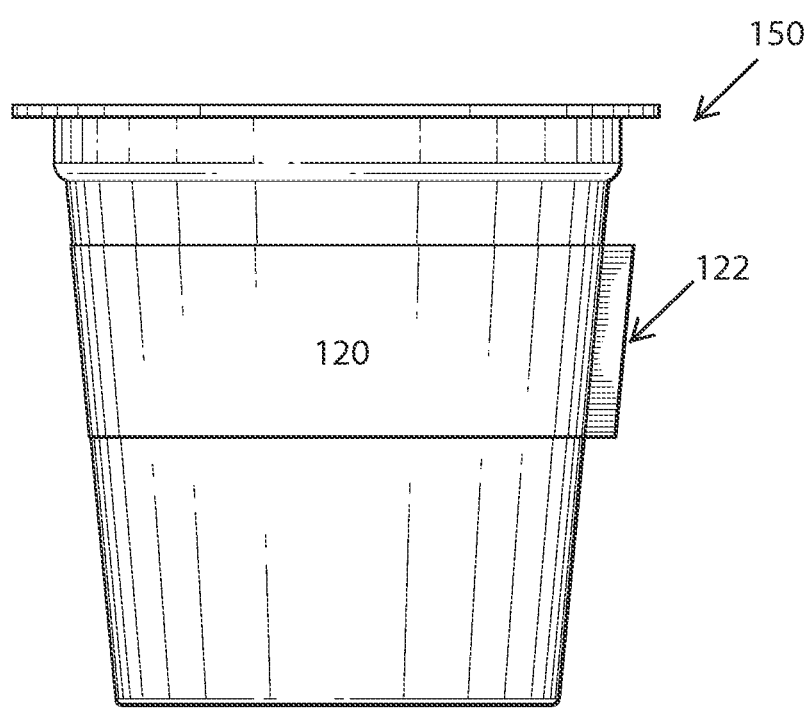
Figure 4:
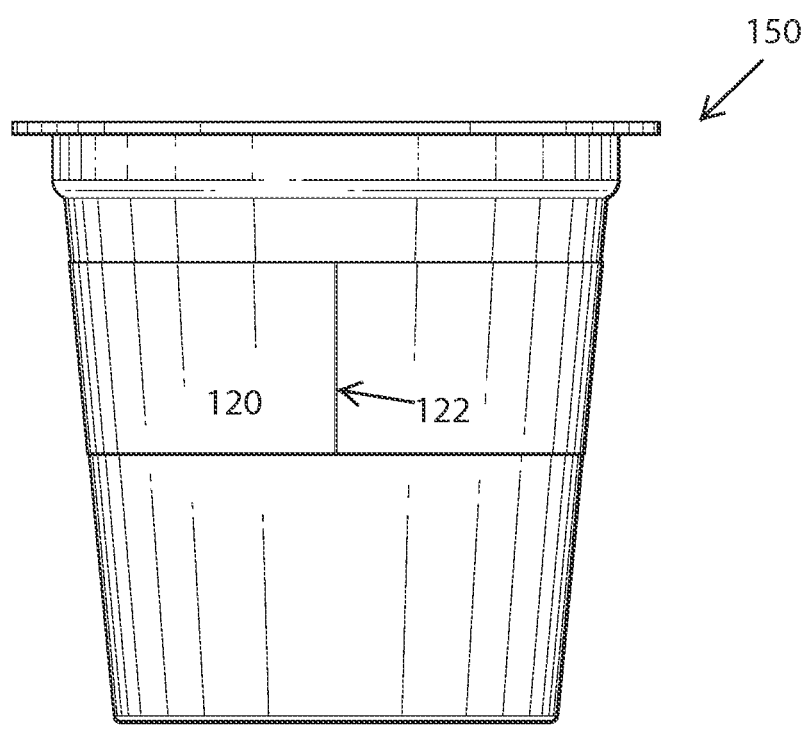
Figure 5:
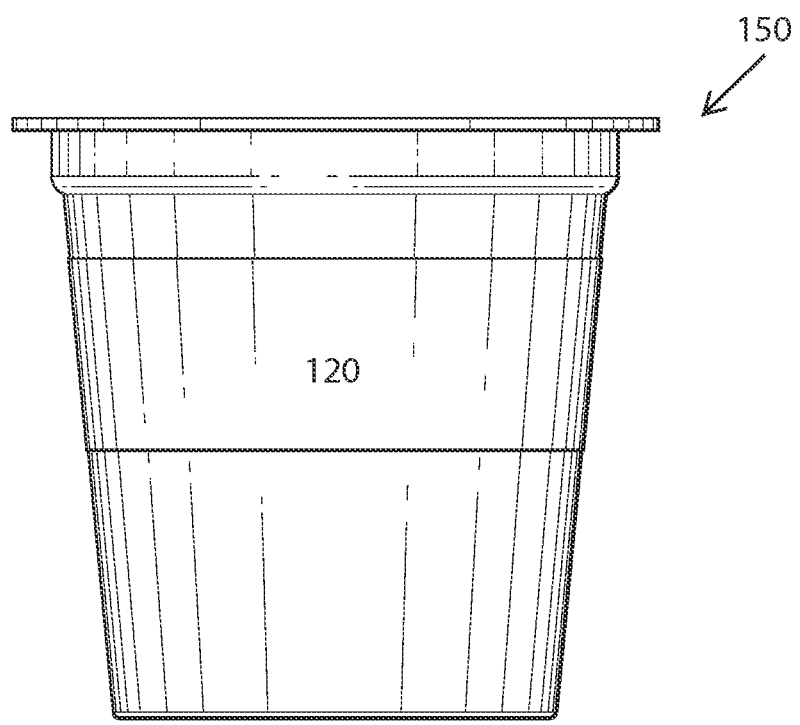
Figure 6:
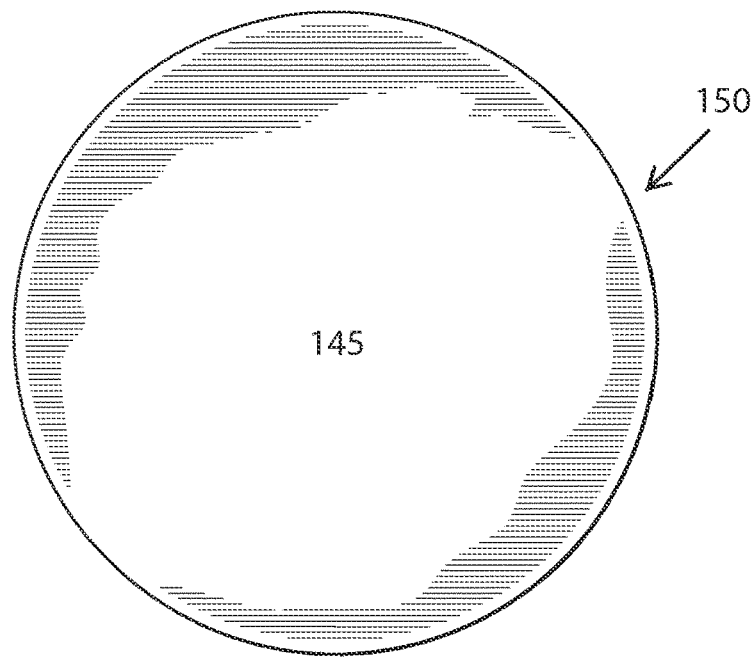
Figure 7:
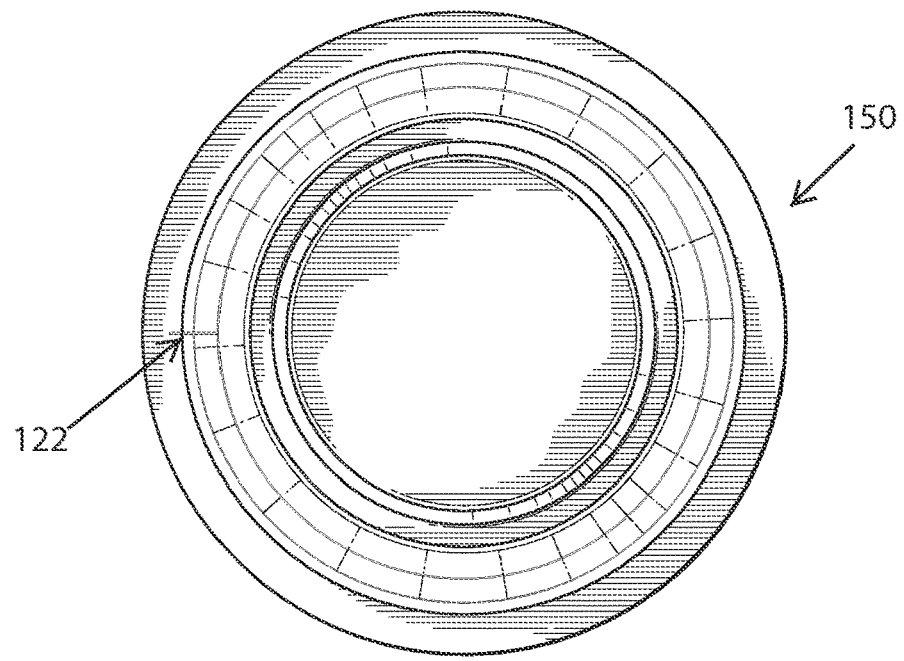
Figure 8:
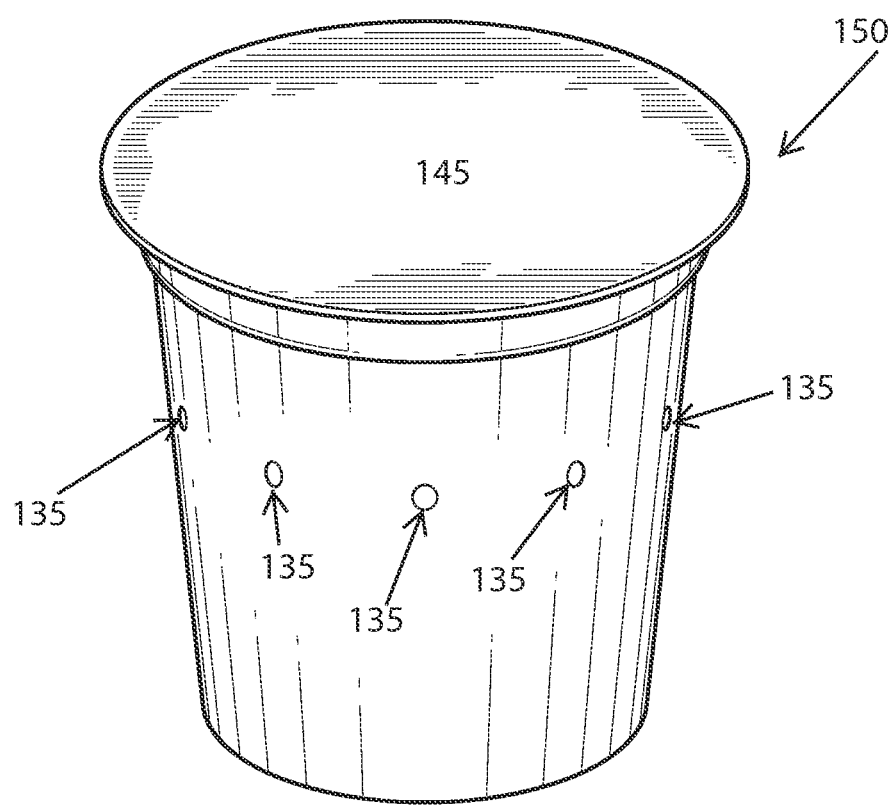
Figure 9:
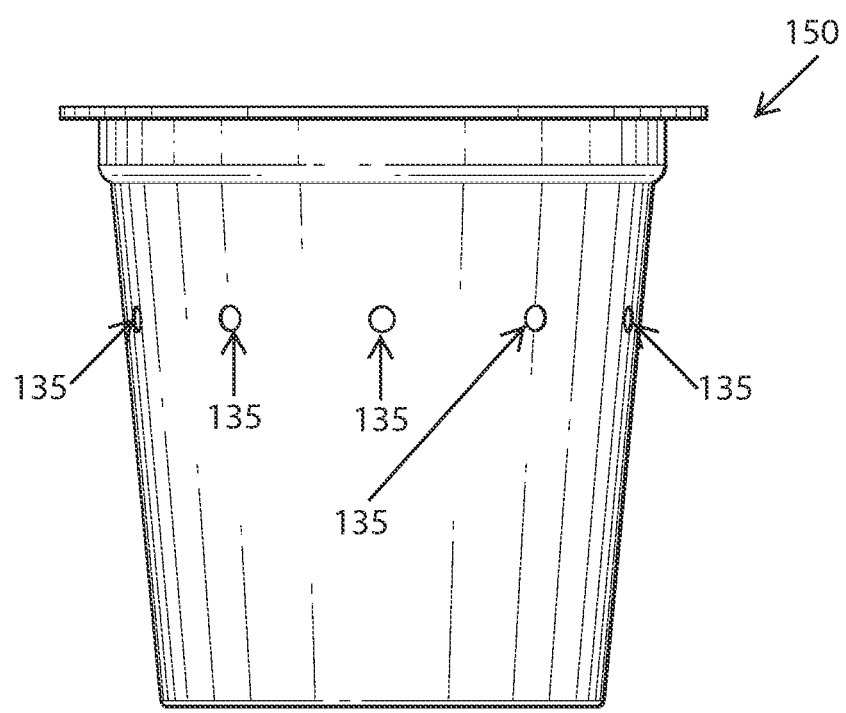
Figure 10:
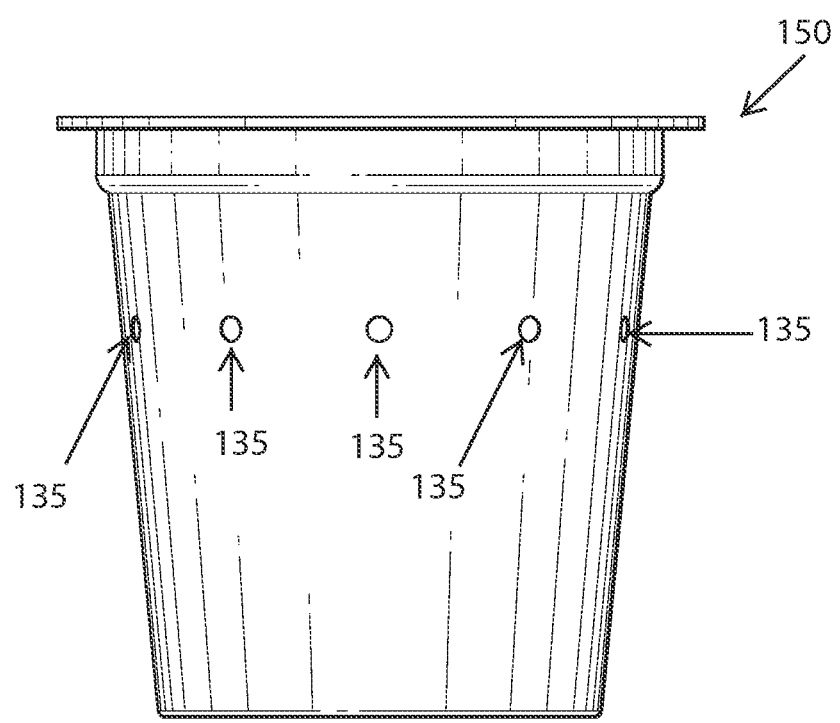
Figure 11:
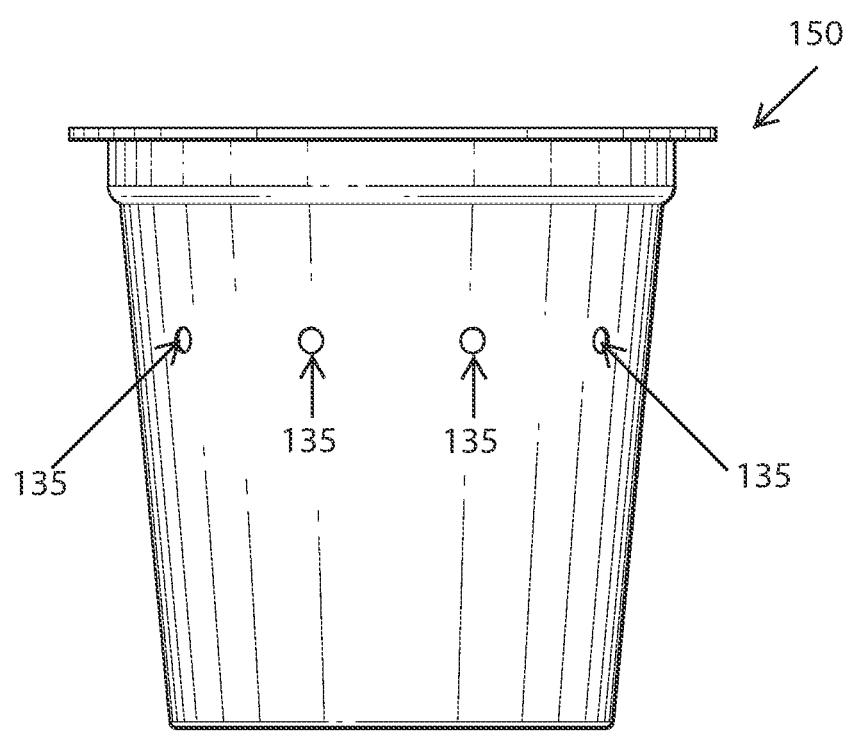
Figure 12:
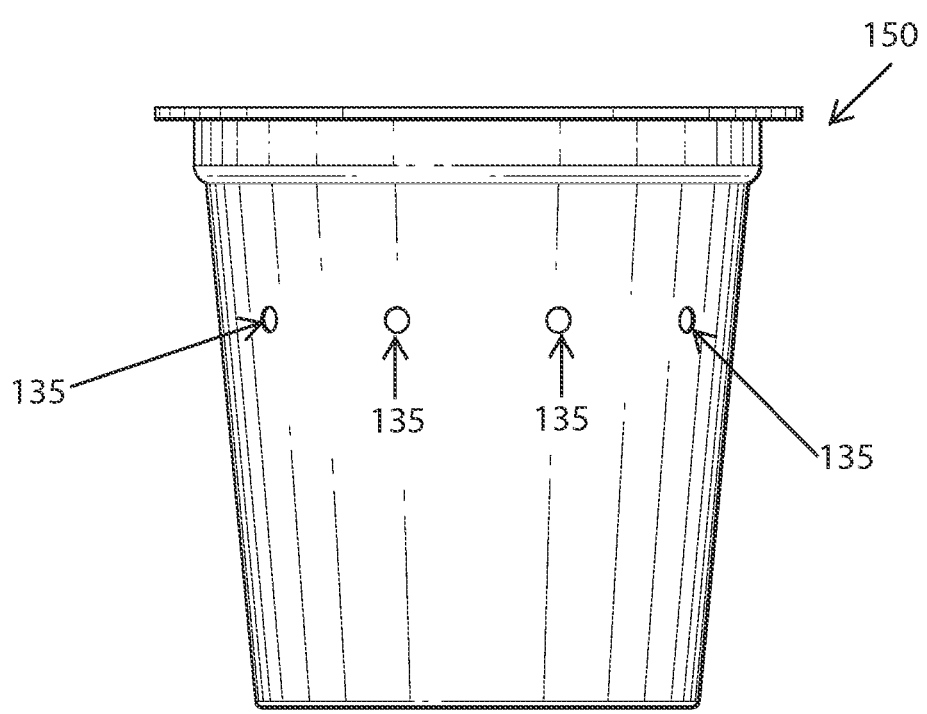
Figure 13:
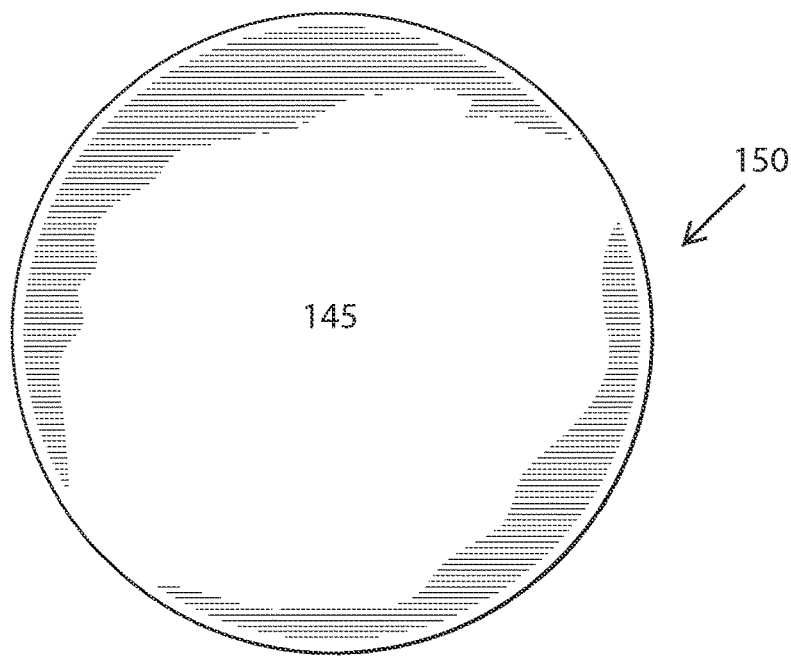
Figure 14:
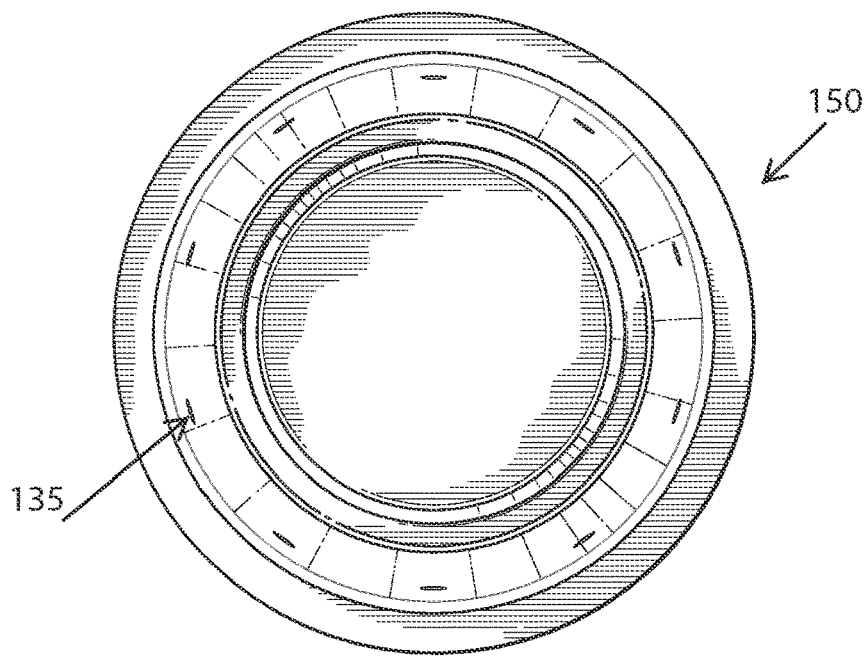
Figure 15:
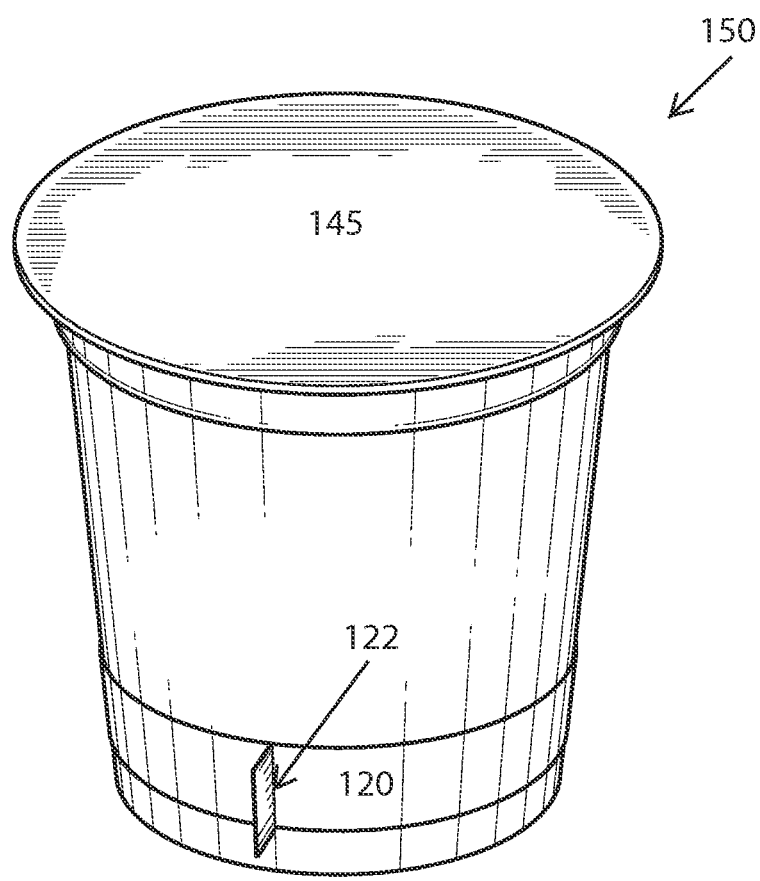
FIGS. 15-30 show another embodiment of a pod according to the invention with the apertures in the side of the pod located near the bottom of the device.
Figure 16:
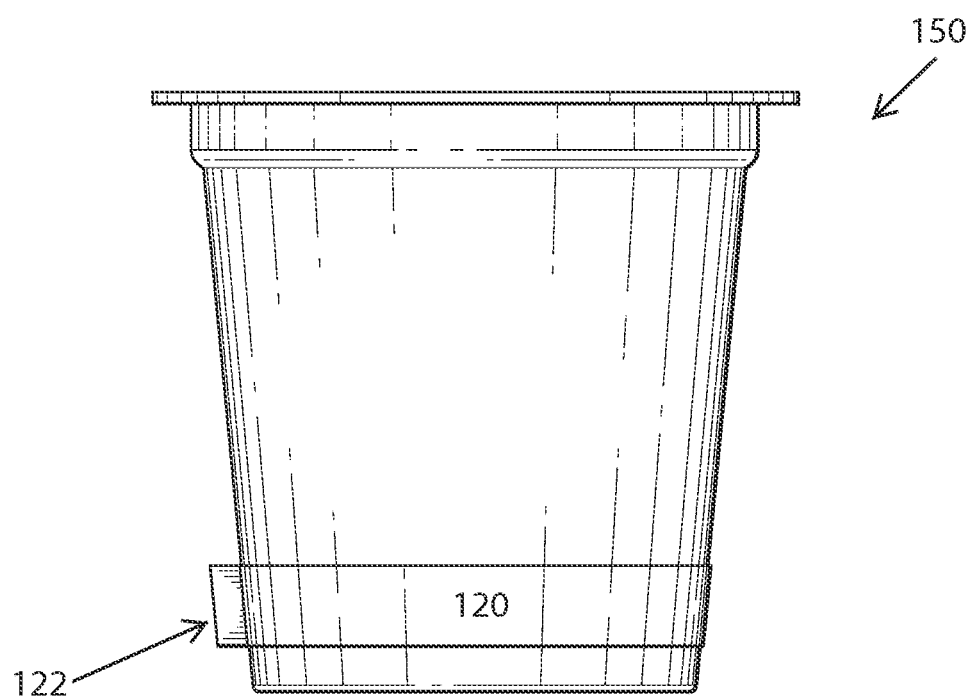
Figure 17:
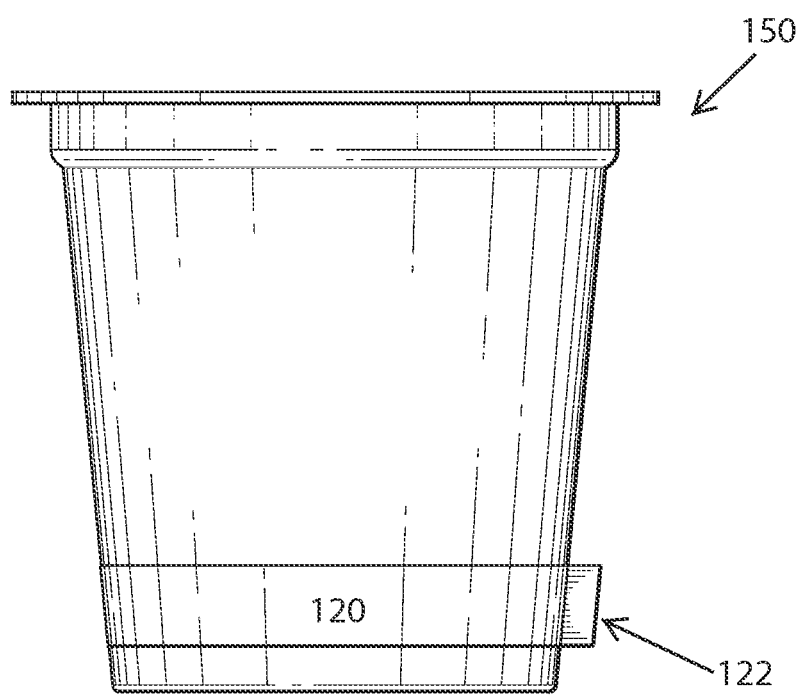
Figure 18:
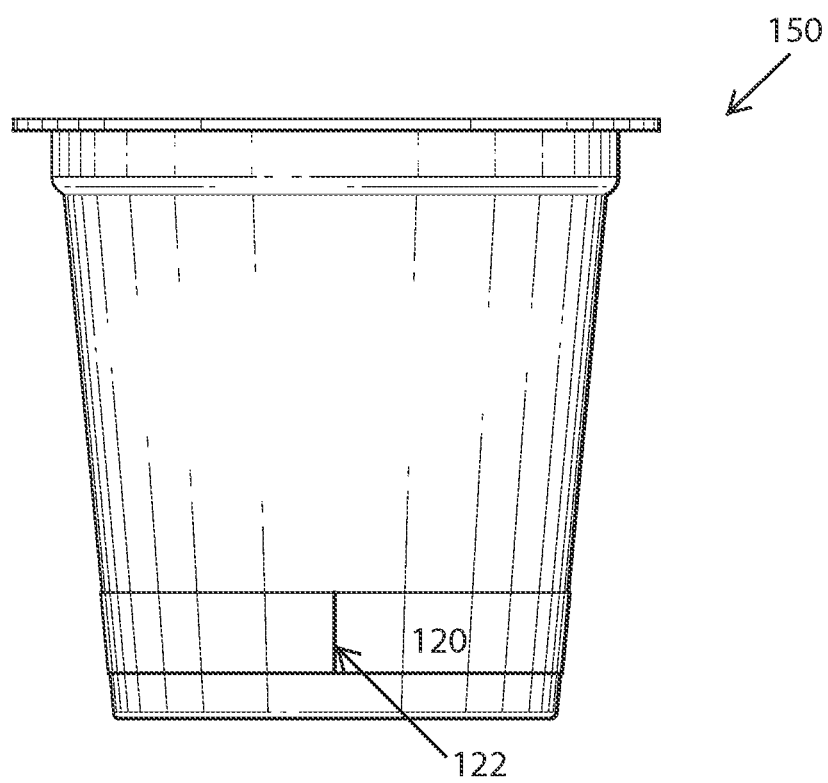
Figure 19:
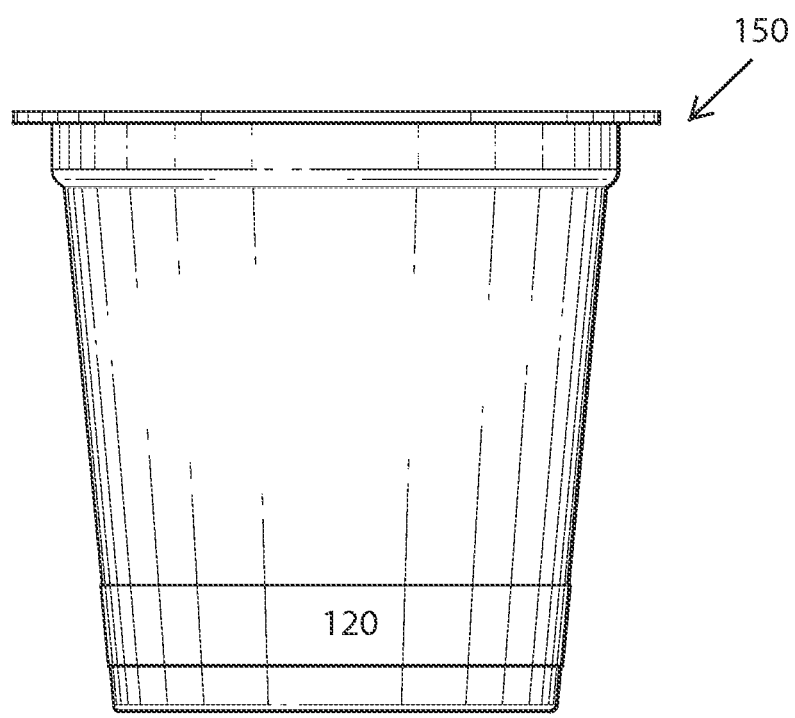
Figure 20:
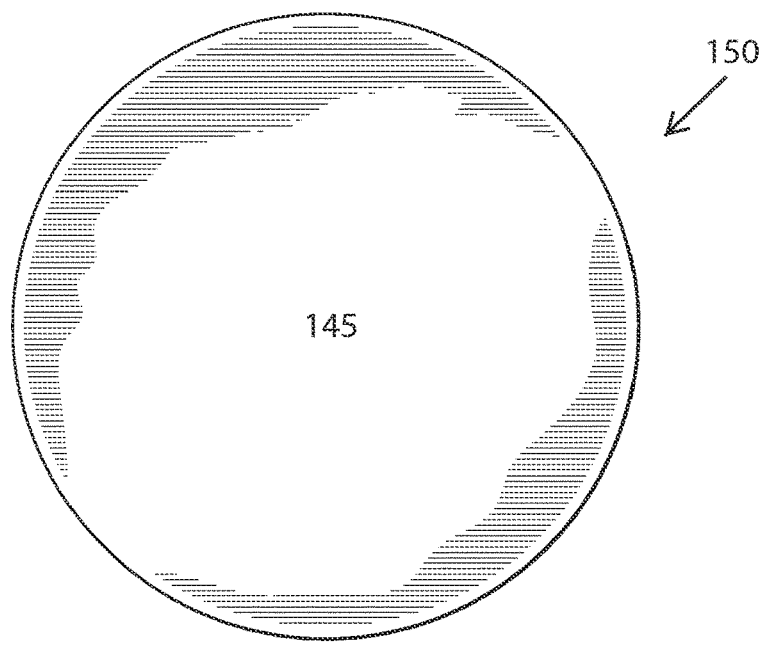
Figure 21:
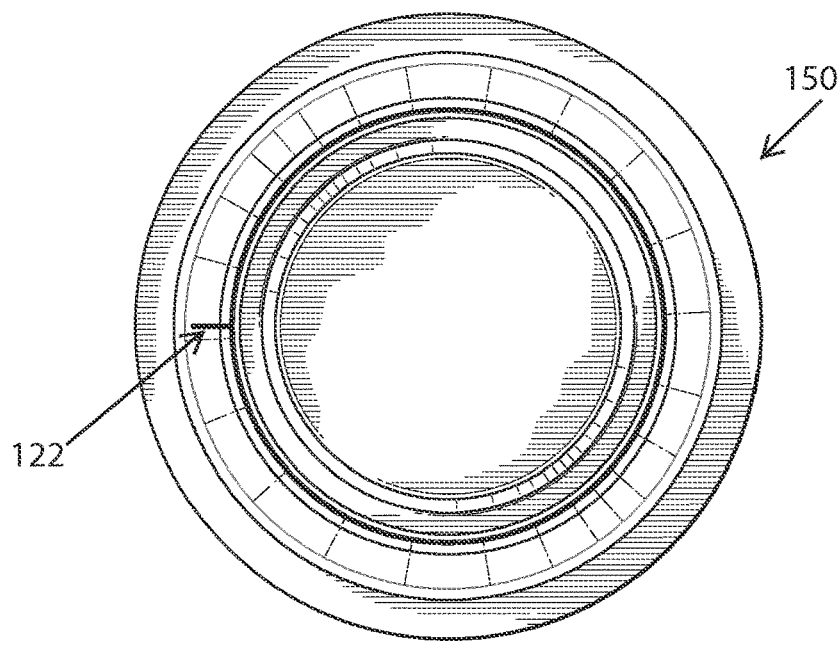
Figure 22:
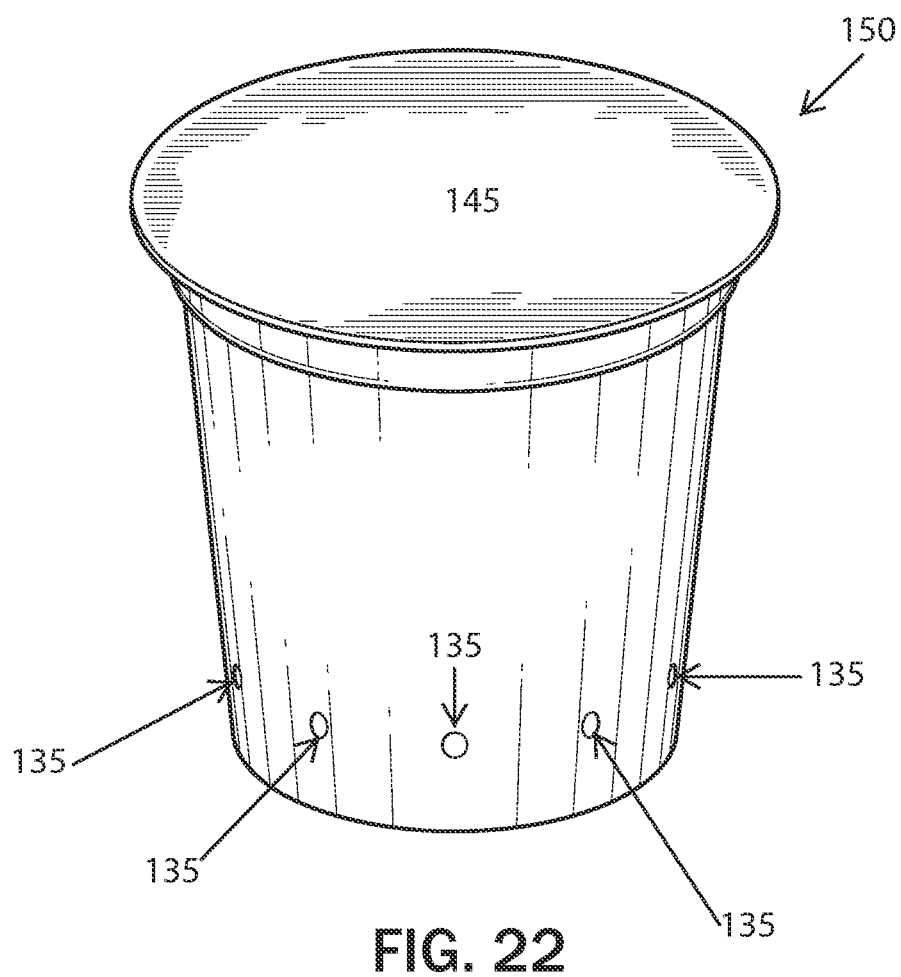
Figure 23:
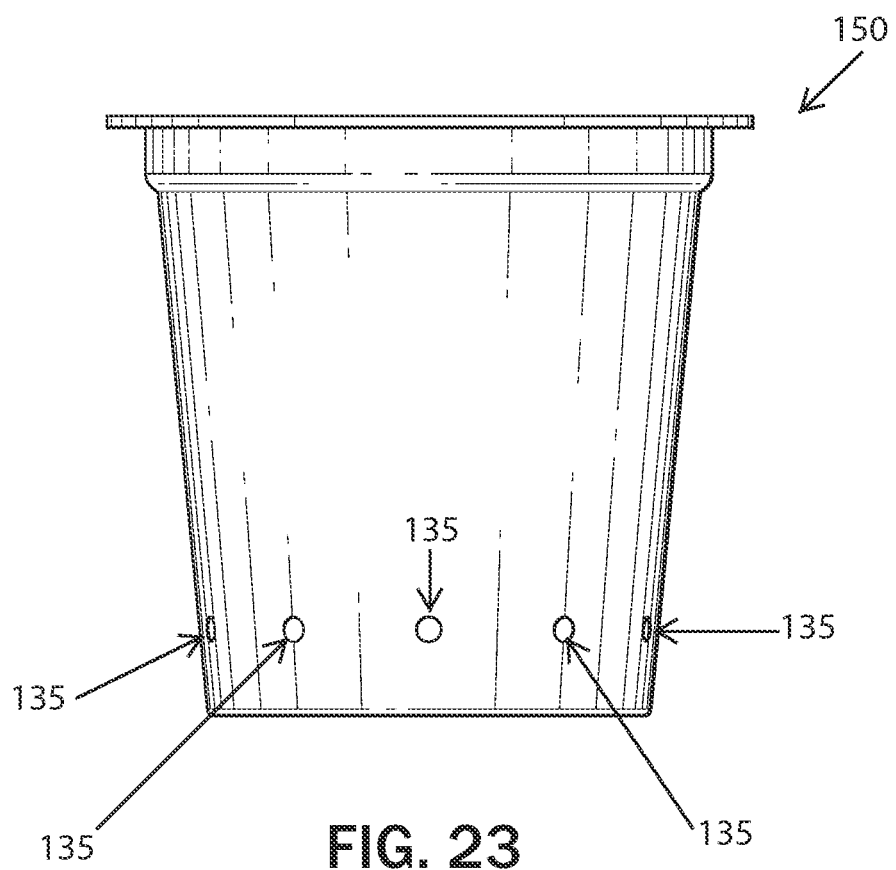
Figure 24:
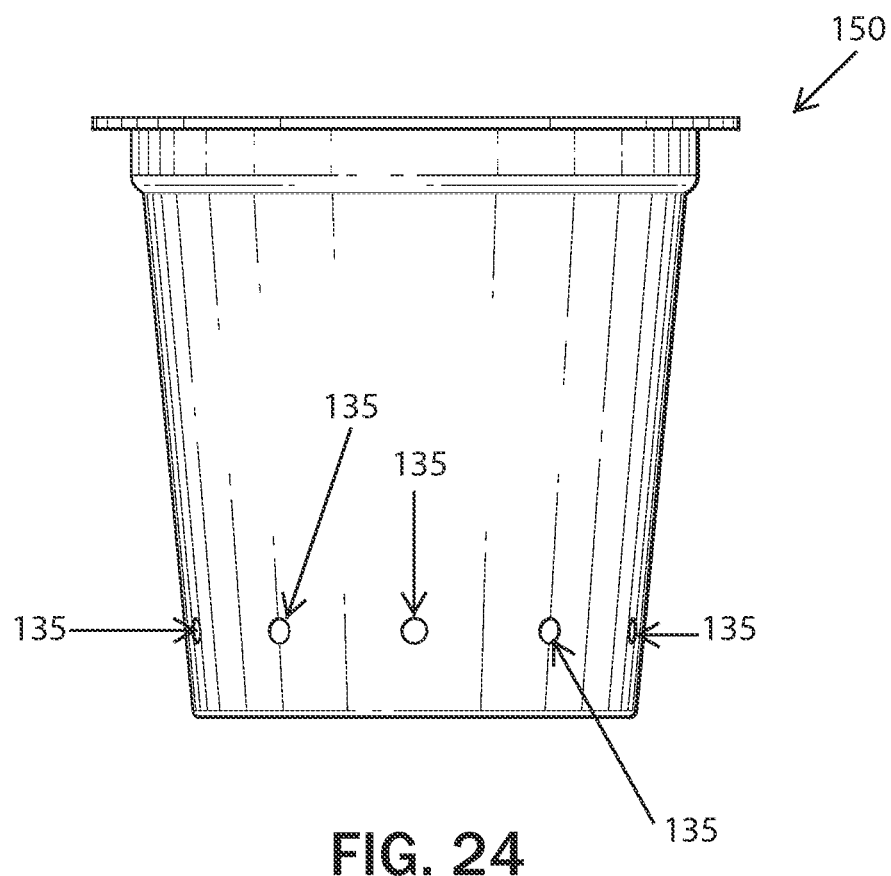
Figure 25:
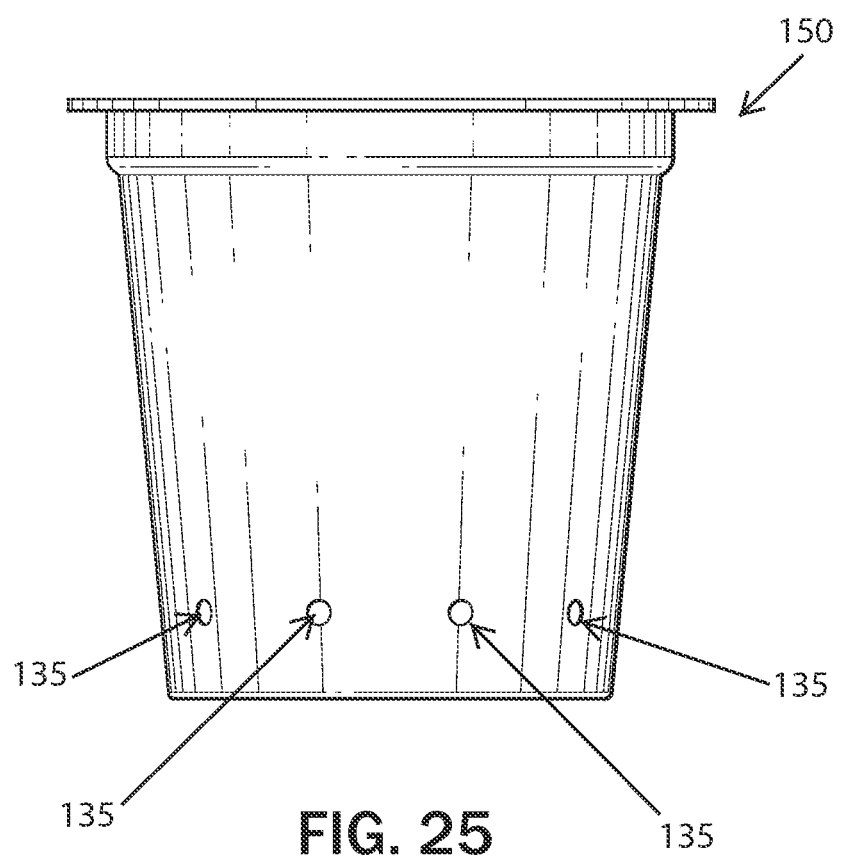
Figure 26:
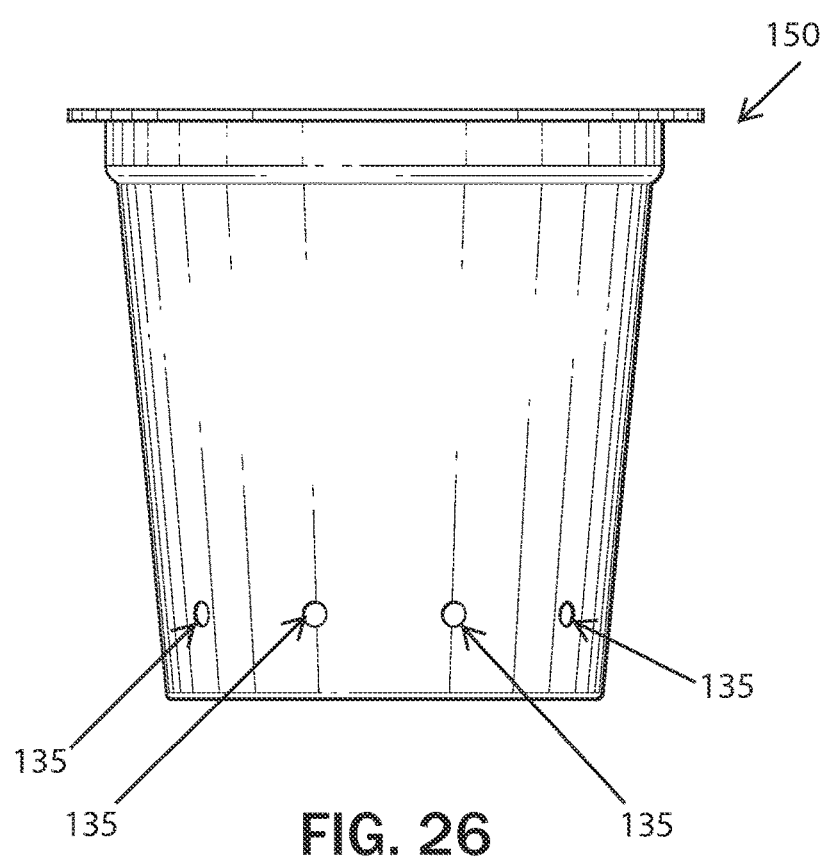
Figure 27:
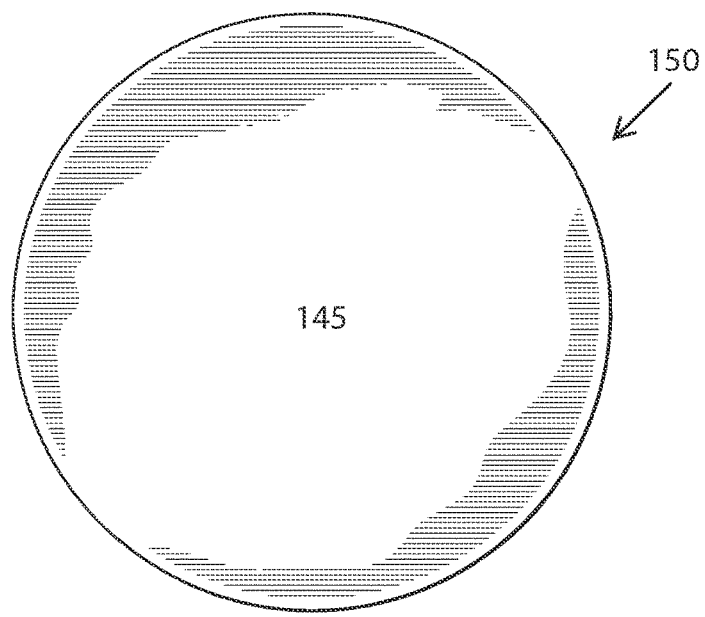
Figure 28:
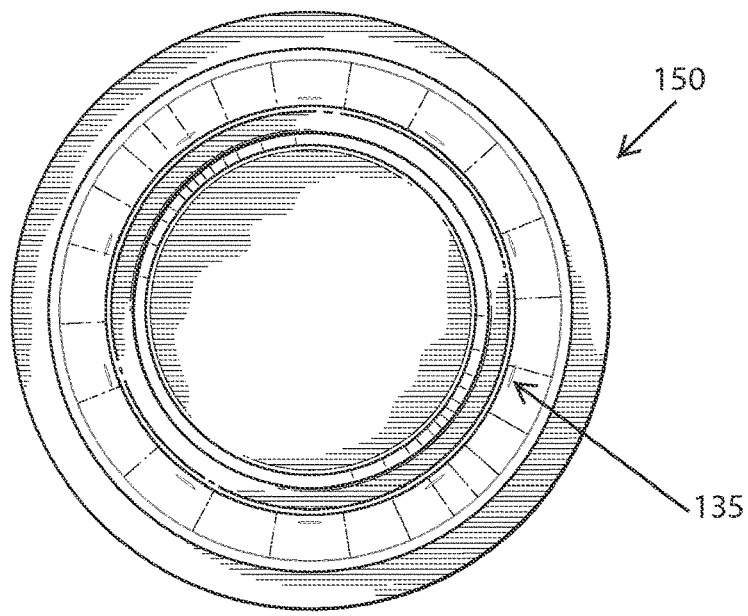

Reference is being made in detail to presently preferred embodiments of the invention. Selective embodiments are provided by way of explanation of the invention, which is not intended to be limited thereto. In fact, those of ordinary skill in the art may appreciate upon reading the present specification and viewing the present drawings that various modifications and variations can be made.

FIGS. 1-30 show multiple embodiments of the improved pod according to the present invention which can be used for cleaning and/or for helping to avoid over pressurization and the consequences thereof.

FIGS. 1-14 show one embodiment of the pod 150 according to the invention. The pod 150 contains a plurality of apertures 135 in the side of the pod which may be covered with removable tape 120 or wrapping around in order to prevent the components inside (e.g., cleaning solution/tablet/gel/powder/granules) from spilling out prior to use. The removable tape 120 preferably includes a pull-tab 122 for easy removal of the tape 120. The user removes the tape 120 using the pull-tab 122 in order to expose the apertures 135 prior to use in the brewing machine. The plurality of apertures 135 on the pod 150 may be circular shaped as shown in FIGS. 8-12 or they can be another shape or configuration, such as, for example, triangles, stars, T-shaped, plus sign shaped, etc. Circular shaped apertures 135 are preferably about ⅛ inch in diameter in size but are not limited to that single size. The shape and location of the apertures 135 on the pod 150 can vary to optimize spray and/or flow to the inside wall of the canister, particularly for a cleaning pod. Apertures 135 may be cross-shaped or t-shaped, or they may be star shaped, square-shaped, sickle-shaped, or triangular. Further, while the embodiments in the Figures show all of the apertures 135 at the same height above the bottom of the pod 150, it is not necessary for all of the apertures 135 to be at the same height. A greater degree of cleaning may be possible with apertures 135 at alternating heights.

For the embodiment of the invention shown in FIGS. 1-14, the plurality of apertures 135 are located near the top portion of the cleaning pod/cup in order to direct the flow of cleaning fluid onto the insides of the canister starting at a height close to the top of the canister. Preferably, the plurality of apertures are located in the top ⅓ of the pod 150. For a standard pod/cup having a height of about 2-inches, it is more preferred that the plurality of apertures 135 are located about ½-inch to ¾-inch down from the top.

For the embodiment of the invention shown in FIGS. 15-28 which is more applicable for use as a beverage pod rather than a cleaning pod, but still having the added function of helping to avoid over pressurization, the plurality of apertures are located closer to the bottom of the pod 150. Preferably, the plurality of apertures are located in the bottom ⅓ of the pod 150. For a standard pod/cup having a height of about 2-inches, it is more preferred that the plurality of apertures 135 are located about ½-inch to ¾-inch up from the bottom of the pod.

It is understood that both embodiments of the invention shown in FIGS. 1-14 and FIGS. 15-28 are able to reduce the possibility of over pressurization of the pod 150 during the brewing or cleaning process due to the pod's increased exit flow area.

Both embodiments of the invention shown in FIGS. 1-14 and FIGS. 15-28 include ten evenly spaces apertures 135 around the perimeter of the pod 150 at a uniform height. Other aperture configurations including a smaller or greater number of apertures are included in the scope of the invention. The spacing between apertures 135 may also be varied and/or non-uniform in order to optimize flow rates and surface contact area for the cleaning fluid.

The pod 150 according to the invention may be made out of a thin plastic material, preferably a bio-degradable material, with a top foil or cover that can be pierced with the pins/needles in the machine (not shown). The top foil 145 is securely fastened to the top of the pod 150 by a heat-seal or glue creating a water tight seal. The top foil 145 should be securely fastened to the top of the pod 150 so the cleansing agent(s) or beverage substance inside will not spill or spoil during storage. It is also preferred to have a strong seal on the top foil 145 for mixing and in order to maintain the flow of the fluid through the pod and either out the apertures 135 or out through the bottom of the cup rather than out the top of the pod.

In order to use the pod, the foil/tape 120 or wrapping is removed from the perimeter by either peeling it back or by using the pull-tab 122 to remove the entirety of the foil/tape 120. The pod 150 is then placed into the canister of the brewing machine (not shown) in the same manner as a beverage pod. Upon closing the machine, the needles in the upper and lower portions of the machine pierce a hole in the top and the bottom of the cleaning pod/cup 150. The pierced hole (not shown) in the bottom of the cleaning pod/cup 150 enables not only for the flow of the cleaning liquid out through that opening through the cannulized piercing pin contained in the hole, but it also enables for the release of any lingering fluid or cleaning solution inside the pod/cup when removing the pod from the canister prior to discarding it. Upon activating of the brewing process hot water flows through the upper piercing pin in the machine which penetrates into the internal compartment in the pod through the top foil. The hot water mixes with the substance in the pod (either a cleaning substance or beverage substance) and the resulting liquid fills the pod and flows out of the pod through the bottom piercing pin in the canister as well as through the apertures 135 in the side of the pod 150.

For a pod according to the invention intended for use as a cleaning pod, while it may be preferred to use a pod that is about the same height as the existing beverage pods in order for the cleaning solution to contact the piercing needles inside the machine, the cleaning pod/cup 150 could also be shorter in height and/or more narrowly shaped to increase cleaning of the needles and inside walls of the canister.

Figure 29:
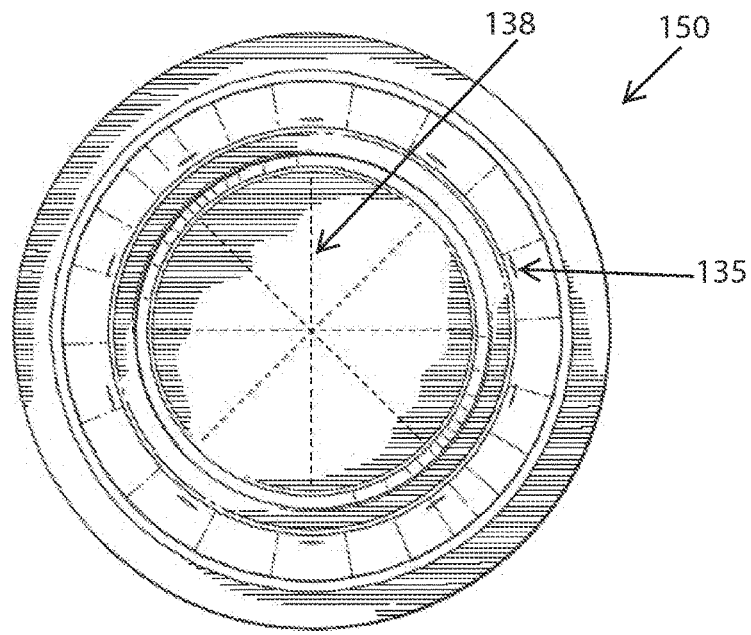
Figure 30:
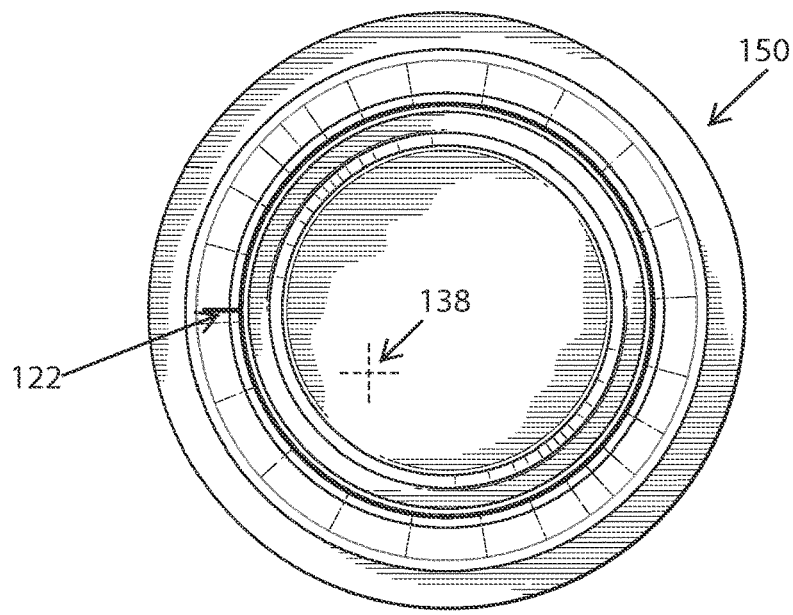
Figure 31:
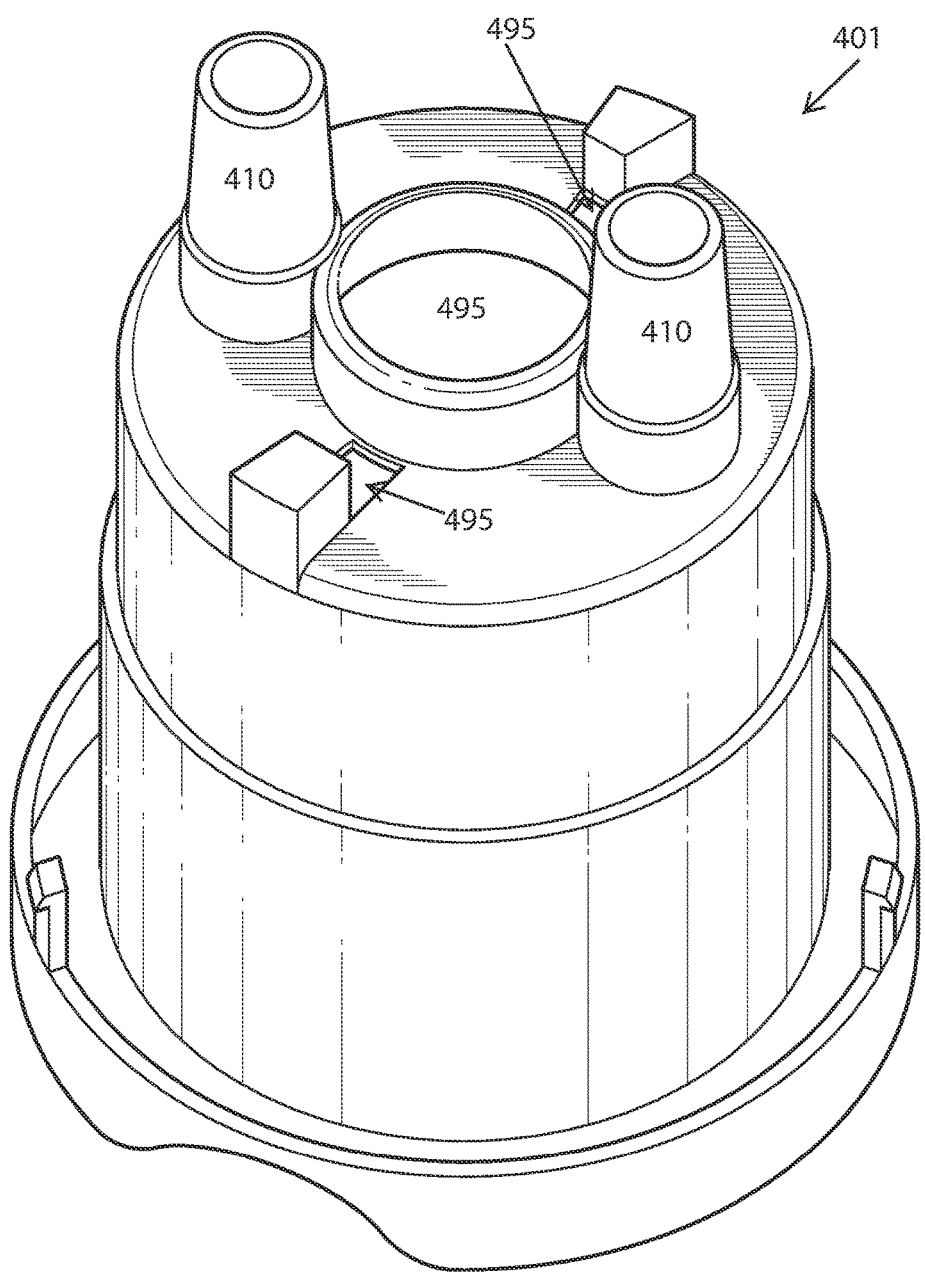
FIGS. 31 through 35 show a modified canister for a single beverage brewing machine according to the invention with a plurality of cannulized piercing pins in the bottom of the canister in several views including a perspective view on the canister in an upside down position (FIG. 31), a top view with the canister right side up (FIG. 32), a top view of the canister with a pod inserted into the canister (FIG. 33) and a cross section view taken down the middle of the canister with cup shown in FIG. 33 along section line 28-28 (FIG. 34). The embodiment in FIGS. 31-34 include two piercing pins in the bottom of the canister. In the embodiment shown in FIG. 35, the modified canister includes four piercing pins in the bottom. The modified canister according to the invention can be removable from the brewing machine.
Figure 32:
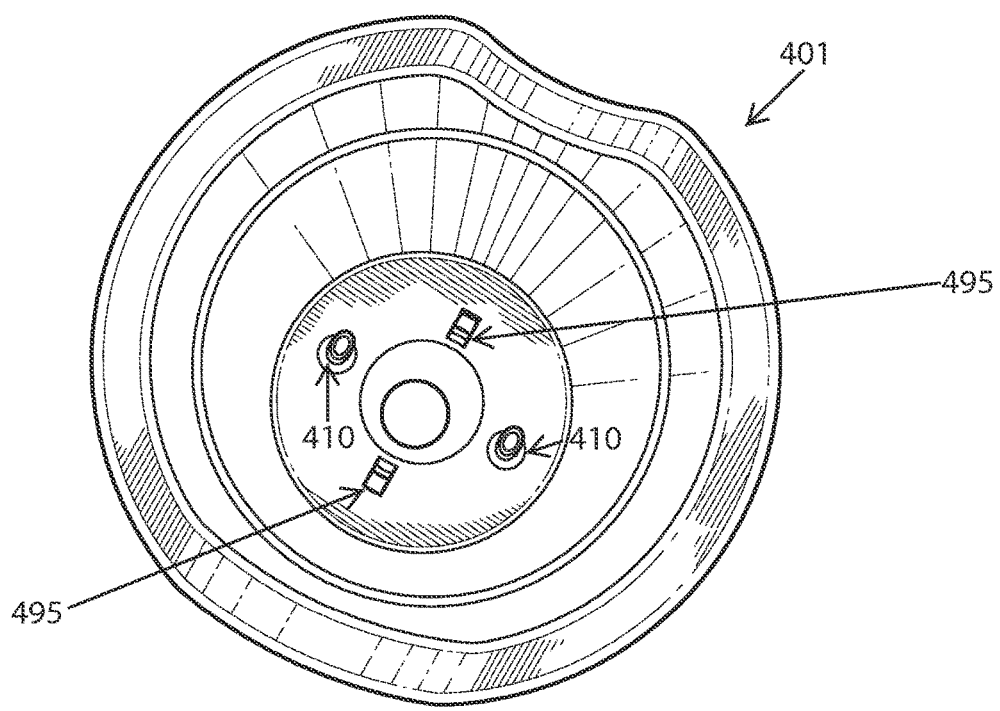
Figure 33:
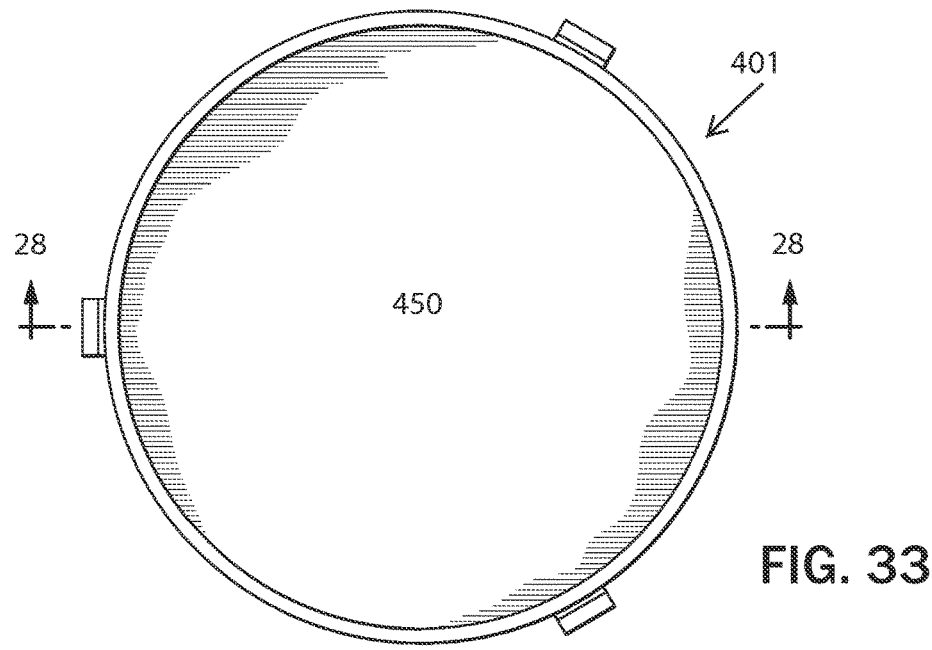

Another feature of Applicants' improved pod that can be included is a pressure relief, such as, for example, a weakened part of the plastic pod and/or a blow out panel. FIGS. 29 and 30 show example ways to achieve this feature using perforations 138 in the bottom of the pod. The weakened plastic is designed to break at a minimum preset pressure inside the pod, e.g., the maximum normal operating pressure for the brewing machine. When the pressure in the pod exceed the predetermined pressure (e.g., 3 bars), the plastic breaks at the perforations 138 releasing the pressure inside the pod allowing fluid to safely drain out of the bottom of the pod instead of exploding out of the top of the machine. The pressure relief perforations 138 can be configured in the shape of a small plus sign in an area of the bottom of the pod as shown in FIG. 30 or there could be multiple perforations along the bottom of the bottom of the pod as shown in FIG. 29. Other perforation configurations and alternative locations, e.g., the side of the pod, are also included in the scope of the invention.

Figure 34:
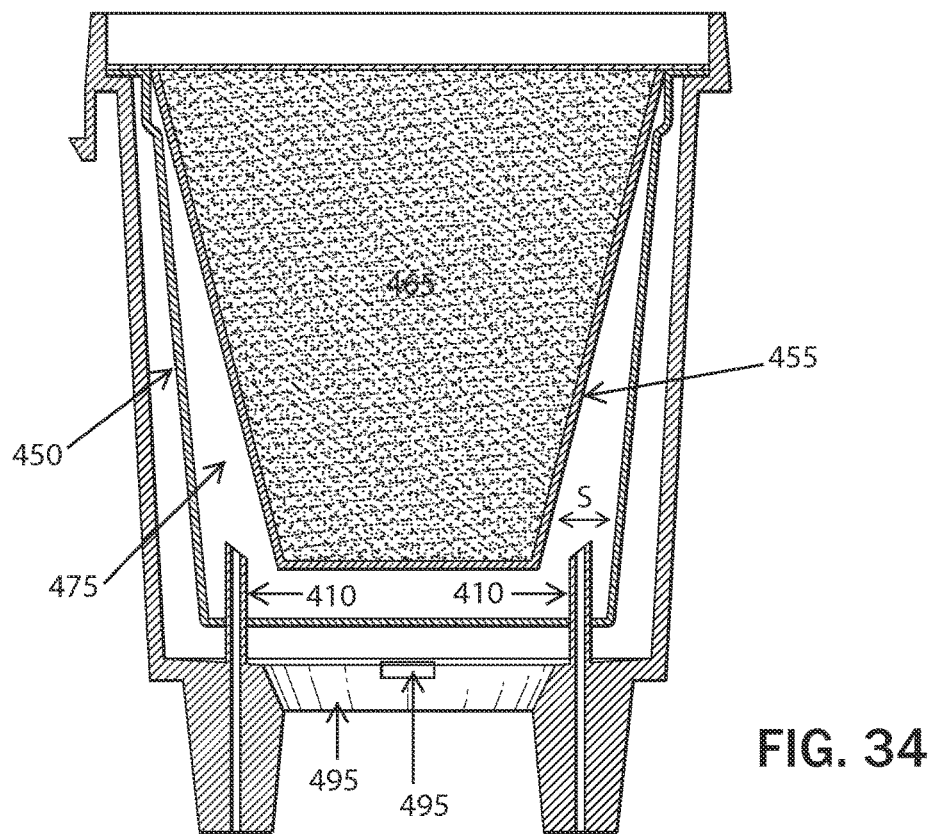
Figure 35:
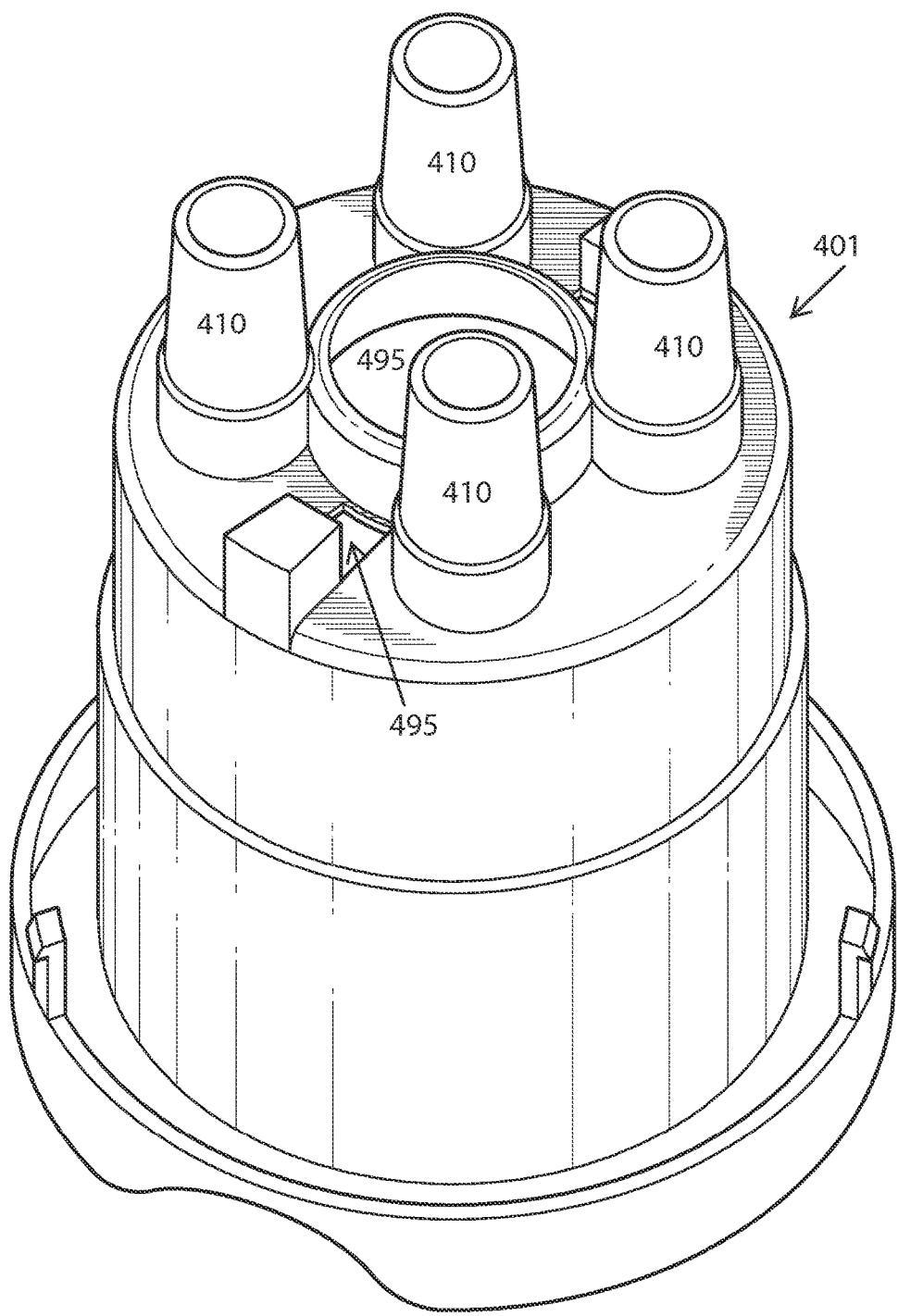

Other ways to increase the exit flow area of the pods and thus reduce the chance for over pressurization of the pod during use and a resulting explosion is to increase the exit flow area for fluid out of the pod. Applicants' modified canister configurations accomplish that. FIGS. 31 through 35 show a modified canister 401 for a single beverage brewing machine according to the invention with a plurality of cannulized piercing pins at the bottom of the canister. FIGS. 31-34 show an embodiment with a pair of piercing pins 410 in a perspective view with the canister 401 shown in an upside down position (FIG. 31), a top view with the canister 401 right side up (FIG. 32), a top view of the canister 401 with a pod 450 inserted into the canister 401 (FIG. 33), and a cross section view taken down the middle of the canister 401 with pod 450 shown in FIG. 33 along section line 28-28 (FIG. 34). When the pod 450 is forced down onto the piercing pins 410 the bottom of the plastic pod is punctured and the piercing pins push through apertures/openings created in the bottom of the pod 450. As shown in FIG. 34, the piercing pins 410 are positioned off center such that they do no puncture the pod's internal filter 455. Most current beverage pods include the cone-like filter configuration shown in FIG. 34 which allows for the use of the pods in the canister irrespective of the rotational position of the pod—there is a space S between the inside side wall of the pod 450 and the outside surface of the pod internal filter 455 near the bottom of the pod and filter. Applicants have discovered that increasing the number of piercing pins 410 to more than one, preferably two, most preferably four (as shown in FIG. 35) helps avoid over pressurization downstream of the filter, including the instance of an unexpected clogged piercing pin 410.

For the embodiments of the invention shown in FIGS. 31-35, when the improved canister 401 is used in a single cup brewing machine a top piercing needle (not shown) punctures the top of the pod 450 creating a path for pressurized hot water into the pod 450. The water mixes with the beverage powder or granules (not shown) located inside the pod 450 on the upstream side of the filer 455 (designated as 465 in FIG. 34). The fluid is pushed through the filter 455 into the cavity 475 inside the pod 450 downstream of the filter 455 where the fluid accumulates and is pushed (and/or drips) out of the pod 450 through the piercing pins 410. In some instances when the puncture holes in the bottom of the pod 450 are not liquid tight, the liquid will flow out the puncture holes around the outside of the piercing needle(s) 410 in which case the liquid exits the canister through any one or more of the secondary apertures 495 in the bottom of the canister 401.

As for most existing canisters in single cup brewing machines, the modified canister according to the present invention can be removable from the brewing machine. Applicants' modified and improved canister can be used with existing pod designs as well as the improved pod designs described above.

Figure 36:
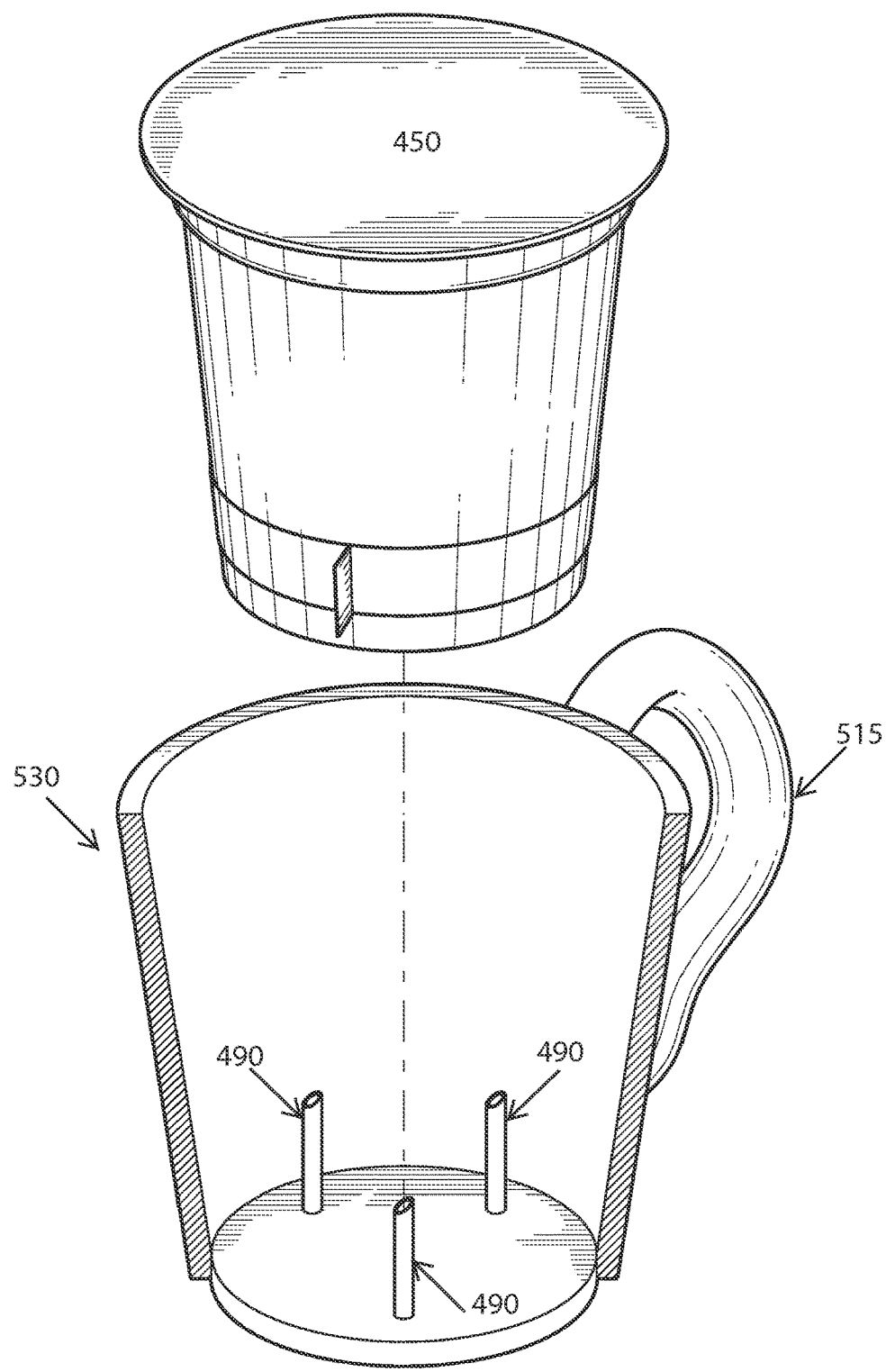
FIGS. 36 through 38 show a cross-sectional view of handheld pod puncturing/perforating device according to the invention in a mug-type configuration. The embodiments shown in FIGS. 36 through 38 show alternative configurations for the bottom of the puncturing/perforating device including a plurality of piercing pins (FIGS. 36 and 37) and a combination of a piercing pin and cutting bladed (FIG. 38).
Figure 37:
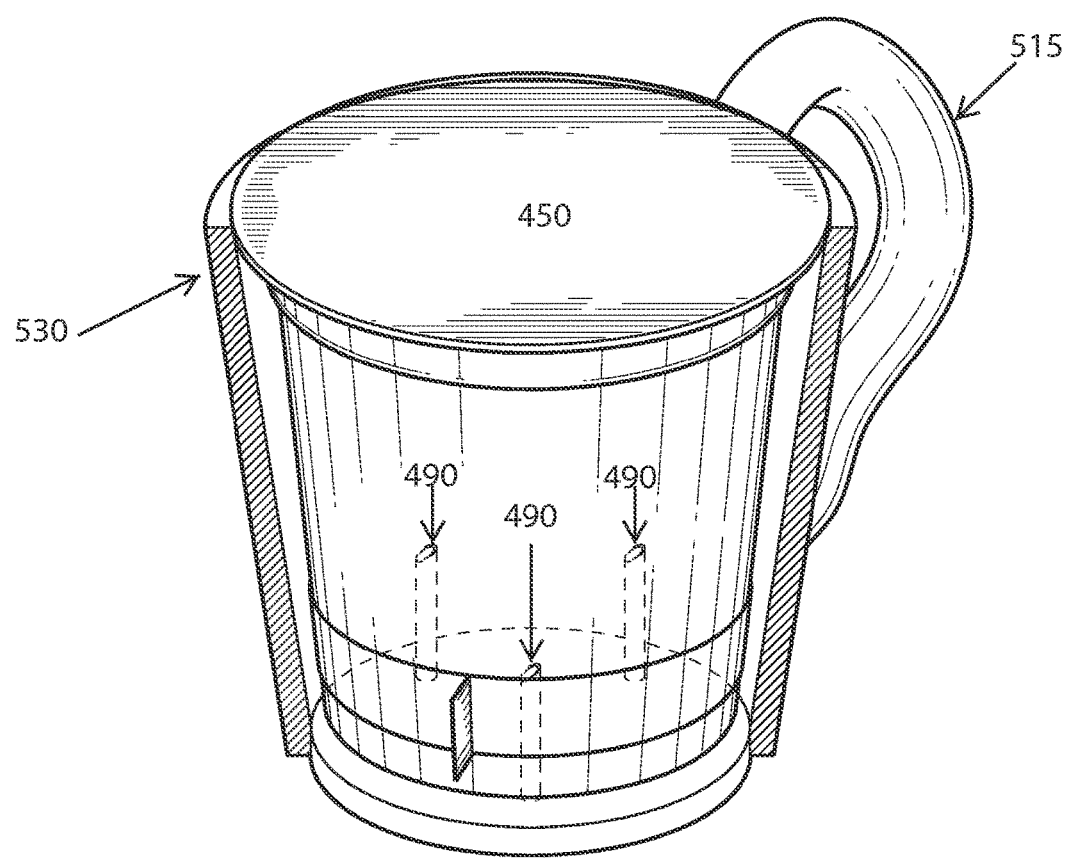
Figure 38:
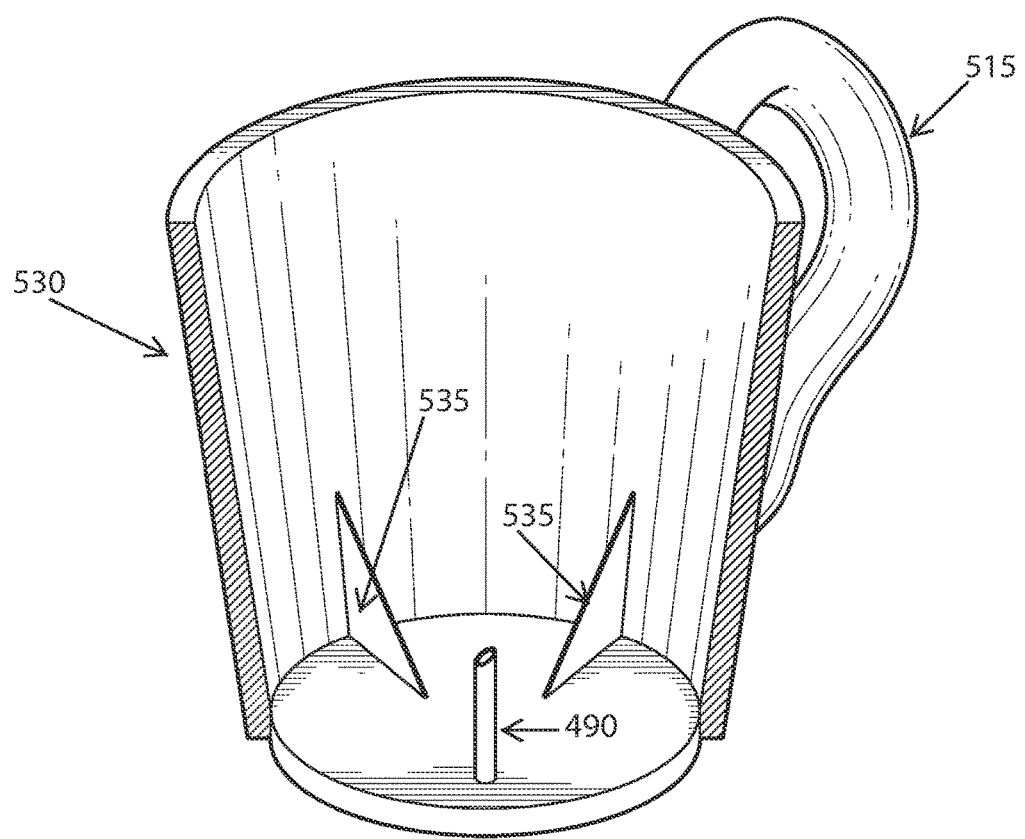

Yet another device that can be used separately with existing pod designs and/or in conjunction with either or both of the modified pods and canisters herein described is a handheld pod puncturing/perforating device. The handheld pod puncturing/perforating device according to the present invention provides another way to increase the exit flow are for pods. Example embodiments in a mug-type configuration are shown in FIGS. 36-38. FIGS. 36 through 38 show a cross-sectional view of handheld pod puncturing/perforating device 530 in a mug-type configuration having a handle 515. FIGS. 36 and 37 show a configuration having a plurality of piercing pins 490 (which can be but need not be cannulized) and FIG. 38 shows a configuration with a combination of a piercing pin 490 and cutting blades 535. FIGS. 36 and 37 show a pod 450 according to the present invention positioned above the puncturing/perforating device 530 prior to insertion and positioned inside the puncturing/perforating device 530 with the piercing pins 490 through the bottom of the pod 450. While the embodiments shown in FIGS. 36-38 shown piercing pins 490 having the same height, it is more preferable to have different heights for each piercing pin 490 for a smaller required force to push the pod 450 down in the puncturing/perforating device 530.

As shown in FIG. 37, the removable tape on the pod can be left in place prior to use of the puncturing/perforating device 530. Alternatively, the removable tape on the pod can be removed prior to use of the puncturing/perforating device 530.

Yet another embodiment of the invention is a reusable pod comprising the apertures in the side, either near the top of the device or near the bottom as described in previous embodiments. A reusable pod according to the invention includes a removable and replaceable lid (e.g, screwed fitting or snap on) or a lid that is hinged allowing the lid to be opened and closed. The reusable pod can be used for cleaning the canister and/or for beverages. Depending on the desired use, the reusable pod is filled with the desired cleaning solution/tablet/gel/powder compound or beverage granules, etc., and the lid is put into place. The lid according to this embodiment is preferably made out of a durable material (e.g., hard plastic) that can withstand washing. Each of the lid and the bottom of the reusable pod according to this embodiment of the invention comprises at least one aperture or indentation configured to receive the top piercing pin in the machine and the bottom piercing pin in the canister. For those embodiments of the invention with a plurality of piercing pins in the canister the bottom of the reusable pod according to the invention is configured with a larger indention/aperture or with a plurality of indentations/apertures to receive the piercing pins. The upper piercing pin in the machine which supplies the incoming hot water passes through the aperture in the top of the reusable pod or is received in an aperture that includes a pathway for the incoming water to travel inside the reusable pod.

In one embodiment intended for use with beverages, the reusable pod further comprises a filter internal to the pod to keep grinds and the like from exiting the pod with the beverage. Alternatively, the reusable pods side apertures could be made with a fine mesh in the openings. Still further the reusable pods could include additional fine mesh openings in the side and/or bottom of the reusable pod through which the beverage passes.

A flow restrictor, not shown in the figures, can also be included in the pod device according to the invention. The flow restrictor can be a porous or non-porous material inside the pod at the bottom. The flow restrictor functions to increase the flow out of the side apertures and lessen the flow out of the piercing pin(s) in the bottom of the canister and/or openings in the bottom of the pod. Accordingly, the use of a flow restrictor is more probable when the device is used for cleaning as it is more desirable to have cleaning solution exiting the side of the pod. Flow restrictors with varying porosity can be used for varying flow rates out the bottom of the pod which may be desirable depending on the material (e.g., the type of cleaning solution or tables or pellets, etc.) used. A water filter mesh or fabric, such as for ponds, could be used as a flow restrictor.

On one embodiment of the invention with the side apertures in the pod located near the top, an internal filter positioned lower than the apertures inside the pod can function as both filter and an flow restrictor.

We claim:

1. A pod for a brewing machine comprising a plastic cup shaped housing having a bottom, a cylindrically shaped side wall having an inside surface and an outside surface, said side wall connected to the bottom and extending upward away from the bottom, said bottom and said side wall forming an internal compartment with an interior surface on said bottom, said top of said side wall forming a circular rim and having a flat lip;
   said side wall comprising a plurality of apertures through the wall, said apertures positioned circumferentially around said wall along the top half of said wall;
   a foil cover sealed on the top of said side wall forming a watertight seal on the top of said pod;
   said bottom comprising indentations configured to break when a pressure inside said pod exceeds a predetermined amount.

2. The pod according to claim 1, wherein said apertures are circular in shape.

3. The pod according to claim 2, wherein said apertures are about ⅛ inch in diameter.

4. The pod according to claim 1, comprising at least ten apertures in said side wall.

5. The pod according to claim 4, wherein said ten apertures are positioned along at least two different heights up from said bottom from said pod.

6. The pod according to claim 1, wherein said plurality of apertures are located at a distance up from said bottom of said pod of about two thirds of the total height of said pod.

7. The pod according to claim 1, wherein said indentations are configured to break at 3 bars.

8. The pod according to claim 1, comprising at least one pair of crossing indentations.

9. The pod according to claim 1, further comprising a flow restrictor inside said pod on top of said bottom.

10. The pod according to claim 1, further comprising a removable tape over said plurality of apertures sealing said pod at said plurality of apertures until said tape is removed.

11. The pod according to claim 10, further comprising a cleaning substance inside said internal compartment for cleaning a brewing machine when said pod is inserted into said machine and hot water is forced through said pod.

12. A pod for a brewing machine comprising a plastic cup shaped housing having a bottom, a cylindrically shaped side wall having an inside surface and an outside surface, said side wall connected to the bottom and extending upward away from the bottom, said bottom and said side wall forming an internal compartment with an interior surface on said bottom, said top of said side wall forming a circular rim and having a flat lip;

said side wall comprising a plurality of circular apertures through the wall, said apertures positioned circumferentially around said wall along the bottom half of said wall;

said side wall comprising a foil cover sealed on the top of said side wall forming a watertight seal on the top of said pod;

said exterior of said pod comprising removable tape over said plurality of apertures sealing said pod at said plurality of apertures;

said bottom comprising indentations configured to break when a pressure inside said pod exceeds a predetermined amount.

13. The pod according to claim 12, wherein said apertures are about ⅛ inch in diameter.

14. The pod according to claim 12, comprising at least ten apertures in said side wall.

15. The pod according to claim 14, wherein said ten apertures are positioned along at least two different heights up from said bottom of said pod.

16. The pod according to claim 12, wherein said plurality of apertures are located at a distance up from said bottom of said pod of about one third of the total height of said pod.

17. The pod according to claim 12, wherein said indentations are configured to break at 3 bars.

18. The pod according to claim 12, comprising at least one pair of crossing indentations.

* * * * *